(12) United States Patent
Wilson et al.

(10) Patent No.: US 12,474,464 B2
(45) Date of Patent: *Nov. 18, 2025

(54) PERSONNEL SAFETY SENSING

(71) Applicant: SALUNDA LIMITED, Oxfordshire (GB)

(72) Inventors: John Wilson, Bicester (GB); Grant Nicholls, Hampshire (GB)

(73) Assignee: SALUNDA LIMITED, Oxfordshire (GB)

( * ) Notice: Subject to any disclaimer, the term of this patent is extended or adjusted under 35 U.S.C. 154(b) by 269 days.

This patent is subject to a terminal disclaimer.

(21) Appl. No.: 17/984,686

(22) Filed: Nov. 10, 2022

(65) Prior Publication Data
US 2023/0071988 A1    Mar. 9, 2023

Related U.S. Application Data

(63) Continuation of application No. 17/270,108, filed as application No. PCT/GB2019/052263 on Aug. 12, 2019.

(30) Foreign Application Priority Data

Aug. 28, 2018 (GB) .................................. 1813975
Oct. 26, 2018 (GB) .................................. 1817474
(Continued)

(51) Int. Cl.
G01S 13/76     (2006.01)
G01S 5/02      (2010.01)
(Continued)

(52) U.S. Cl.
CPC ............. *G01S 13/765* (2013.01); *G01S 5/02* (2013.01); *G01S 13/0209* (2013.01);
(Continued)

(58) Field of Classification Search
CPC ........... F16P 3/147; F16P 3/142; G08B 21/02; G08B 25/10; G08B 13/19652;
(Continued)

(56) References Cited

U.S. PATENT DOCUMENTS 6,054,950 A    4/2000 Fontana
6,108,636 A    8/2000 Yap et al.
(Continued)

FOREIGN PATENT DOCUMENTS

GB    2491518 A    12/2012
JP    5097045 B2   12/2012
(Continued)

OTHER PUBLICATIONS

Technical Examination Report, Brazil Patent Application No. BR122024005879-0, dated Dec. 4, 2024.
(Continued)

*Primary Examiner* — Olumide Ajibade Akonai
(74) *Attorney, Agent, or Firm* — MARSHALL, GERSTEIN & BORUN LLP

(57) ABSTRACT

A safety sensing system implements a method for a person in an industrial environment comprises providing a personnel locator device (10) for location on a person and a reference system comprising a plurality of nodes (20) located at predetermined locations in the industrial environment (100). Radio ranging signals are transmitted between the nodes (20) and the personnel locator device (10) and measurements of times of flight of the radio ranging signals are derived. The location of the personnel locator device (10) is calculated based on the measurements of the times of flight of the radio ranging signals and reference information representing the predetermined locations of the nodes (10). It is determined if the calculated location of the personnel locator device (10) is within one or more danger zones in the
(Continued)

industrial environment (100) and a warning signal is output in response thereto.

19 Claims, 14 Drawing Sheets

(30) Foreign Application Priority Data

| Feb. 14, 2019 | (GB) | .................................... | 1902010 |
|---|---|---|---|
| Mar. 20, 2019 | (GB) | .................................... | 1903818 |
| Jun. 17, 2019 | (GB) | .................................... | 1908632 |

(51) Int. Cl.
*G01S 13/02* (2006.01)
*G01S 13/87* (2006.01)
*G01S 13/88* (2006.01)

(52) U.S. Cl.
CPC .......... *G01S 13/876* (2013.01); *G01S 13/886* (2013.01); *G01S 2205/09* (2020.05)

(58) Field of Classification Search
CPC ........ G06V 20/52; G06V 20/58; G01S 17/93; G01S 13/886; H04W 4/021; H04W 4/025
See application file for complete search history.

(56) References Cited

U.S. PATENT DOCUMENTS

| 6,212,444 | B1 * | 4/2001 | Kato ................. G05B 19/4061 |
|---|---|---|---|
| | | | 700/255 |
| 6,782,264 | B2 | 8/2004 | Anderson |
| 6,876,326 | B2 | 4/2005 | Martorana |
| 7,089,019 | B2 | 8/2006 | Ormson |
| 7,132,981 | B1 | 11/2006 | Roberts |
| 7,606,496 | B1 | 10/2009 | Mitchell |
| 7,802,724 | B1 | 9/2010 | Nohr |
| 7,868,760 | B2 | 1/2011 | Smith et al. |
| 8,618,931 | B2 | 12/2013 | Rossmann et al. |
| 9,107,043 | B2 | 8/2015 | Gupta |
| 9,125,381 | B2 | 9/2015 | Gurley et al. |
| 9,322,654 | B2 | 4/2016 | Böckem |
| 9,396,398 | B2 | 7/2016 | Kozicz et al. |
| 9,398,412 | B2 | 7/2016 | Prechner et al. |
| 9,452,531 | B2 * | 9/2016 | Kikkeri ................. B25J 9/1676 |
| 9,623,558 | B1 | 4/2017 | Stubbs et al. |
| 9,672,713 | B2 | 6/2017 | Beggs et al. |
| 9,836,941 | B2 * | 12/2017 | Mendiola ................. F16P 3/147 |
| 9,955,559 | B2 | 4/2018 | Engelen et al. |
| 10,024,952 | B2 | 7/2018 | Want et al. |
| 10,139,282 | B2 | 11/2018 | Chrostowski |
| 10,176,349 | B1 | 1/2019 | Mountz |
| 10,185,034 | B2 | 1/2019 | Smith et al. |
| 10,235,857 | B2 * | 3/2019 | Jones ..................... H04W 4/80 |
| 10,264,982 | B2 | 4/2019 | Ahmed et al. |
| 10,402,662 | B2 | 9/2019 | Kozicz et al. |
| 10,488,550 | B2 | 11/2019 | Albert et al. |
| 10,597,053 | B2 | 3/2020 | Mian et al. |
| 10,885,758 | B2 | 1/2021 | Johnson et al. |
| 11,079,464 | B2 | 8/2021 | Finlay et al. |
| 11,157,710 | B2 | 10/2021 | Sundia et al. |
| 11,163,034 | B2 | 11/2021 | Olsen et al. |
| 11,238,717 | B2 | 2/2022 | Johnson et al. |
| 11,263,568 | B2 | 3/2022 | Kanukurthy et al. |
| 11,480,044 | B2 | 10/2022 | Menard et al. |
| 11,854,366 | B1 | 12/2023 | Thoma et al. |
| 2002/0122003 | A1 | 9/2002 | Patwari et al. |
| 2002/0172223 | A1 | 11/2002 | Stilp |
| 2003/0017832 | A1 | 1/2003 | Anderson et al. |
| 2003/0179140 | A1 | 9/2003 | Patterson et al. |
| 2006/0271263 | A1 | 11/2006 | Self et al. |
| 2007/0017682 | A1 | 1/2007 | Abrahamsen et al. |
| 2007/0073473 | A1 | 3/2007 | Altan et al. |
| 2007/0236677 | A1 | 10/2007 | VanVoorst et al. |
| 2008/0004904 | A1 | 1/2008 | Tran |
| 2008/0030359 | A1 | 2/2008 | Smith et al. |
| 2008/0169927 | A1 | 7/2008 | Graves et al. |
| 2010/0279707 | A1 | 11/2010 | Fischer et al. |
| 2010/0289662 | A1 | 11/2010 | Dasilva et al. |
| 2011/0153349 | A1 | 6/2011 | Anderson et al. |
| 2011/0170862 | A1 | 7/2011 | Smith et al. |
| 2011/0229145 | A1 | 9/2011 | Smith et al. |
| 2011/0298579 | A1 | 12/2011 | Hardegger |
| 2012/0015670 | A1 | 1/2012 | Boyer et al. |
| 2012/0026041 | A1 | 2/2012 | Murdock et al. |
| 2012/0062725 | A1 | 3/2012 | Wampler, II et al. |
| 2012/0098653 | A1 | 4/2012 | Slack |
| 2013/0038856 | A1 | 2/2013 | Williams et al. |
| 2013/0120192 | A1 | 5/2013 | Larson |
| 2013/0217417 | A1 | 8/2013 | Mohideen et al. |
| 2013/0294266 | A1 | 11/2013 | Lim et al. |
| 2014/0274115 | A1 | 9/2014 | Michalson et al. |
| 2015/0144684 | A1 | 5/2015 | Leung |
| 2015/0153160 | A1 | 6/2015 | James |
| 2015/0158428 | A1 | 6/2015 | Beggs et al. |
| 2015/0161872 | A1 | 6/2015 | Beaulieu et al. |
| 2015/0254986 | A1 | 9/2015 | Fairfield et al. |
| 2016/0019737 | A1 | 1/2016 | Stagg |
| 2016/0025846 | A1 | 1/2016 | Mostov |
| 2016/0097837 | A1 | 4/2016 | Richley et al. |
| 2016/0179062 | A1 | 6/2016 | Marchione |
| 2016/0227634 | A1 | 8/2016 | Engelen et al. |
| 2016/0231426 | A1 | 8/2016 | Smith et al. |
| 2016/0259028 | A1 | 9/2016 | High et al. |
| 2016/0282448 | A1 | 9/2016 | Sen et al. |
| 2016/0292513 | A1 | 10/2016 | Kozicz et al. |
| 2016/0318438 | A1 | 11/2016 | Wadell |
| 2016/0363659 | A1 | 12/2016 | Mindell et al. |
| 2017/0068924 | A1 | 3/2017 | Tanaka et al. |
| 2017/0085293 | A1 | 3/2017 | Marrow et al. |
| 2017/0132884 | A1 | 5/2017 | Kumar et al. |
| 2017/0221334 | A1 | 8/2017 | Zhang et al. |
| 2017/0257717 | A1 | 9/2017 | Milevski et al. |
| 2017/0270761 | A1 | 9/2017 | Jones |
| 2017/0314369 | A1 | 11/2017 | Rosano et al. |
| 2017/0351923 | A1 | 12/2017 | Rice, II et al. |
| 2018/0197052 | A1 | 7/2018 | Yanson et al. |
| 2018/0248623 | A1 | 8/2018 | Ryan et al. |
| 2018/0269715 | A1 | 9/2018 | Hannigan et al. |
| 2018/0323657 | A1 | 11/2018 | Hannigan et al. |
| 2018/0364693 | A1 | 12/2018 | Harshbarger |
| 2019/0043064 | A1 | 2/2019 | Chin et al. |
| 2019/0101377 | A1 | 4/2019 | White et al. |
| 2019/0141470 | A1 | 5/2019 | Hallett |
| 2019/0175411 | A1 | 6/2019 | Awiszus et al. |
| 2019/0175961 | A1 | 6/2019 | Awiszus et al. |
| 2019/0195981 | A1 | 6/2019 | Ding |
| 2019/0302719 | A1 | 10/2019 | Aljuaid |
| 2019/0385583 | A1 | 12/2019 | Muggleton et al. |
| 2020/0064433 | A1 | 2/2020 | Finlay et al. |
| 2020/0099893 | A1 | 3/2020 | Pratt et al. |
| 2022/0355482 | A1 | 11/2022 | Denenberg et al. |
| 2022/0391867 | A1 | 12/2022 | Glaser |

FOREIGN PATENT DOCUMENTS

| KR | 20110019196 A | 2/2011 |
|---|---|---|
| KR | 102389633 B1 | 4/2022 |
| WO | WO-2008080226 A1 | 7/2008 |
| WO | WO-2011136816 A1 | 11/2011 |
| WO | WO-2015041687 A1 | 3/2015 |
| WO | WO-2015144684 A1 | 10/2015 |
| WO | WO-2016011507 A1 | 1/2016 |
| WO | WO-2016124949 A1 | 8/2016 |
| WO | WO-2017/152213 A1 | 9/2017 |
| WO | WO-2017/223451 A1 | 12/2017 |
| WO | WO-2017223008 A1 | 12/2017 |
| WO | WO-2018019553 A1 | 2/2018 |
| WO | WO-2019/084314 A1 | 5/2019 |
| WO | WO-2019/186202 A1 | 10/2019 |

(56) References Cited

FOREIGN PATENT DOCUMENTS

WO     WO-2020/044014 A1     3/2020
WO     WO-2020060938 A1     3/2020

OTHER PUBLICATIONS

Australian Patent Application No. 2019331693, Examination Report, dated Mar. 21, 2024.
Final Office Action, U.S. Appl. No. 17/270,108, mailed Apr. 18, 2024.
Non-final Office Action, U.S. Appl. No. 17/270,108, mailed Sep. 28, 2023.
International Search Report for International Application No. PCT/GB2019052263, dated Dec. 11, 2019.
Examination Report issued to application No. EP 19 753 469.6, dated Mar. 28, 2022.
Teizer et al., "Ultrawideband for Automated Real-Time Three-Dimensional Location Sensing for Workforce, Equipment, and Material Positioning and Tracking", Transportation Research Record, 2081(1), 56-64, 2008.
Monica et al., "Low-complexity UWB-based collision avoidance system for automated guided vehicles", ICT Express, vol. 2, Issue 2, 2016, pp. 53-56, ISSN 2405-9595.
Mucchi et al., "Experimental measurements of the accuracy of commercial UWB real-time localisation systems and proposal of new collision avoidance algorithms for industrial applications", Int. J. Ultra Wideband Communications and Systems, vol. 2, No. 4, 2012.
Andolfo et al., "Real-time accident detection using UWB tracking", 5th International/11th International Construction Specialty Conference (2015, Vancouver, B.C.); Canadian Society for Civil Engineering.
Final Office Action, U.S. Appl. No. 16/659,366, mailed Dec. 21, 2020.
Final Office Action, U.S. Appl. No. 17/387,540, mailed Dec. 21, 2023.
Final Office Action, U.S. Appl. No. 17/387,540, mailed Mar. 2, 2023.
Final Office Action, U.S. Appl. No. 17/387,540, mailed Oct. 29, 2024.
Final Office Action, U.S. Appl. No. 18/157,039, mailed Feb. 21, 2025.
Non-final office action, U.S. Appl. No. 16/659,366, mailed Jul. 20, 2020.
Non-final Office Action, U.S. Appl. No. 16/689,366, mailed Jan. 22, 2020.
Non-final Office Action, U.S. Appl. No. 17/387,540, mailed Apr. 18, 2024.
Non-final Office Action, U.S. Appl. No. 17/387,540, mailed Aug. 24, 2023.
Non-Final Office Action, U.S. Appl. No. 17/387,540, mailed Oct. 4, 2022.
Non-final Office Action, U.S. Appl. No. 18/157,039, mailed Apr. 24, 2024.
Non-final Office Action, U.S. Appl. No. 18/157,039, mailed Aug. 29, 2024.
Notice of Allowance, U.S. Appl. No. 16/659,366, mailed Jun. 18, 2021.
Notice of Allowance, U.S. Appl. No. 17/270,108, mailed Dec. 23, 2024.
Notice of Allowance, U.S. Appl. No. 17/387,540, mailed Feb. 20, 2025.

* cited by examiner

Fig. 21

| |
|---|
| Almanac total number of blocks |
| Almanac block number |
| Number of geometries in block |
| Geometry 1 length |
| Geometry 1 message |
| Geometry 2 length |
| Geometry 2 message |

PERSONNEL SAFETY SENSING

CROSS-REFERENCE TO RELATED APPLICATIONS

This is a continuation of U.S. Patent Application Ser. No. 17/270,108, filed Feb. 22, 2021, which is the United States national phase of International Patent Application No. PCT/GB2019/052263, filed Aug. 12, 2019, which claims the priority benefit of GB Patent Application No. GB1813975.8, filed Aug. 28, 2018, GB Patent Application No. GB1817474.8, filed Oct. 26, 2018, GB Patent Application No. GB1902010.6, filed Feb. 14, 2019, GB Patent Application No. GB1903818.1, filed Mar. 20, 2019, and GB Patent Application No. GB1908632.1, filed Jun. 17, 2019. The entire contents of each of the foregoing priority applications are hereby incorporated by reference herein.

FIELD OF THE DISCLOSURE

The present disclosure relates to methods and devices for increasing safety of personnel in an industrial environment.

BACKGROUND

Industrial environments can be dangerous due to the interaction between people and machinery operating in close proximity. The industrial environment may be noisy or include other distractions that make it difficult for personnel working in the environment to keep track of the operation of machinery, particularly when the machinery may be in motion within the industrial environment.

It would therefore be desirable to introduce a system to alert personnel working in the environment to the presence of machinery or other hazards of which they may not be aware. However, industrial environments can often represent a difficult environment for communication between the different parts of the system. For example, the environment may include metal or other objects when can impede communication between different parts of a system. Examples of such industrial environments includes typical marine environments, e.g. on a ship or other vessel or platform, in a facility in the oil and gas industry or in a factory.

It is therefore desirable to provide a method of locating a person within an industrial environment that is capable of warning the person of the proximity of a piece of machinery or other hazard that is reliable.

GENERAL DESCRIPTION

A first aspect of the present disclosure relates to a method or system for determining if a person has entered a danger zone in an industrial environment.

According to the first aspect of the present disclosure, there is provided a safety sensing method for a person in an industrial environment, the method comprising providing a personnel locator device for location on a person and a reference system comprising a plurality of nodes located at predetermined locations in the industrial environment; transmitting radio ranging signals between the nodes and the personnel locator device; deriving measurements of times of flight of the radio ranging signals between the nodes and the personnel locator device; calculating the location of the personnel locator device within the industrial environment based on the measurements of the times of flight of the radio ranging signals between the nodes and the personnel locator device and reference information representing the predetermined locations of the nodes; and determining if the calculated location of the personnel locator device is within one or more danger zones in the industrial environment and outputting a warning signal in response thereto.

Thus, through the use of the method in accordance with the first aspect of the invention it is possible to determine the location of a personnel locator device and subsequently determine if the personnel locator device is within a danger zone in the industrial environment. This may, therefore, make it possible to alert a person to the presence of dangerous equipment or other hazards. The use of radio ranging signals may advantageously allow the method to function even in environments which include metal or other objects which would otherwise impede communication.

The steps of deriving measurements, calculating the location of the personnel locator device and determining if the calculated location of the personnel device is in one or more danger zones may be performed in the reference system. However, in order for the reference system to be able calculate the location of the personnel locator device, each of the nodes within the system which receives radio ranging signals from the personnel locator device, must then communicate with the other nodes in the reference system, or indeed a separate control device, in order to collate the derived measurements of times of flight so as to calculate the location of the personnel locator device. This additional communication between the nodes, or the control device, increases the complexity of the communications within the system which may increase the risk of failures in the system.

Therefore, as an alternative, the reference information may be communicated to the personnel locator device, and the step of deriving measurements of the times of flight of the radio ranging signals in respect of respective nodes is performed in the personnel locator device. By deriving measurements of times of flight on the personnel locator device and with knowledge of the reference information the personnel locator device will be able to calculate the location of itself. This may mean that the nodes of the reference system do not need to be connected together and thus may simplify the processing involved in the method. Additionally, it may reduce the latency involved in location calculation as it avoids the need for a potentially large number of nodes to communicate with one another.

The step of determining if the calculated location of the person is within one or more danger zones may be performed in the personnel locator device. Once the determination has been made the personnel locator device may go on to take appropriate action. This may, for example, involve taking remedial action. Carrying out this determination on the personnel locator device itself may further reduce the latency in taking appropriate action.

The warning signal may be communicated from the personnel locator device to the reference system. This may advantageously allow a user of the system to become aware of the presence of the person in the danger zone and allow the user to take remedial action, for example by shutting down certain pieces of equipment. Further, by communicating the warning signal to the reference system, the reference system may go on to make other personnel locator devices within the system aware of the presence of a person in the danger zone.

Of course, irrespective of where the steps of deriving of measurements of times of flights and calculation of the location of personnel locator device are performed, the determination if the calculated location of the personnel locator device is within one or more zones may be performed on the personnel locator device, the reference system, or both.

Carrying out the step of determining if the calculated location of the person is within one or more danger zones is performed in the reference system may advantageously mean that the reference system is capable of more quickly taking remedial action, e.g. in the form of shutting down equipment. In this case, the warning signal may be communicated from the reference system to the personnel locator device. Accordingly, the personnel locator device may, in addition or alternatively, take remedial action to the determination of being in one or more danger zones.

In embodiments wherein the warning signal is communication from the personnel locator device to the reference system, the reference system may provide an audible or visible alert to a user in response to the warning signal. By providing a user of the method with an alert, the user may proceed to take appropriate action. This may for example involve the user issuing an alert to the person provided with the personnel locator device and/or involve manually ceasing operation of certain equipment in the industrial environment. Alerting the user in this manner may allow them, for example, to decide whether it is necessary to shut down certain equipment which is proximal to the person, for example that in the danger zone, and whether it is possible to leave other equipment running.

The reference system may cause operation of equipment within the industrial environment to cease in response to the warning signal. Through ceasing operation of the equipment within the industrial environment this may help to avoid any harm coming to a person who has entered a danger zone. This embodiment may also advantageously help to prevent harm to a person in situations wherein a user, or a person provided with the personnel locator device intentionally ignore an audible or visible alert or indeed if they do not notice the alert, e.g. due to a particularly noisy piece of equipment.

In addition or alternatively, once a determination that that the personnel locator device is within a danger zone is made, it may be important to quickly alert the person provided with the personnel locator device that they are within a danger zone, such that they may quickly take action if possible to leave the danger zone. In embodiments wherein the step of determining if the calculated location is within one or more danger zones is performed in the personnel locator device, the personnel locator device may provide audible or visible alert in response to the warning signal. Therefore, as soon as a determination as to the presence in a danger zone is made, a person can immediately be alerted to their presence through the output of an audible or visible alert on the personnel locator device. This may therefore help to ensure that a person is alerted as soon as possible to their presence in a danger zone which may help to avoid an accident.

In addition, or alternatively, to the audible or visual alerts mentioned above, other alerts such as a haptic alert may be provided.

Where the reference information is communicated to the personnel locator device, this may, for example, be communicated using a separate communication system. However, advantageously, the reference information may be communicated to the personnel locator device as part of the radio ranging signals. Communicating the reference information in this manner may reduce the latency in the method, particularly in the step of calculating the location of the personnel locator device. By transmitting the reference information as part of the radio ranging signals, this may mean that the locator device does not need to separately determine whether reference information received is indeed relevant to the radio ranging signal. This is relevant as a single locator device may receive radio ranging signals, and thus reference information, from a number of different nodes.

In embodiments wherein the step of determining if the calculated location of the personnel locator device is within one of the more danger zones, the personnel locator device will need information relating to the danger zones. This information may be stored locally on the personnel locator device. However, particularly in industrial environments, the location, shape and/or size of danger zones may dynamically change and the information stored locally on the personnel locator may quickly become inaccurate. Of course this may be overcome by updating the personnel locator device, for example at a central control device. However, given that the method may use a relatively large number of personnel locator devices, locally storing danger zone information, and updating in this manner may not be appropriate. Therefore, the method may further comprise transmitting zonal information representing the one or more danger zones to the personnel locator device over a radio communication system. Transmitting information to the personnel locator device in this manner, and thus potentially avoiding, or at least minimising, the information stored locally on the personnel locator device may help to ensure that the personnel locator device is kept updated with the most accurate danger zone information thus ensuring that the personnel making use of the system are kept as safe as possible.

Unlike other information such as the reference information representing predetermined locations of the nodes where it may be advantageous to transmit such information as part of the radio ranging signals in order to reduce latency, it may not be necessary for the zonal information. The radio communication system over which the zonal information is transmitted to the personnel locator device may be separate from the radio ranging signals. This may avoid unnecessarily complicating the radio ranging signals and may allow more complicated information to be transmitted.

The one or more danger zones may be defined in a number of ways. For example, the one or more danger zones may be predetermined by a user prior to use of the method. This may, for example, involve a user designating one or more spaces as danger zones. Taking an oil rig as an example, this may involve setting an area around a perimeter of a platform as a danger zone.

A danger zone may be associated with a piece of equipment located in the industrial environment. Such equipment in the industrial environment typically has an associated danger zone in which personnel should not enter. This may, for example, be due to the presence of excessive noise or heat, or the increased risk of physical injury from moving parts. However, equipment is often moved around an industrial environment and so the danger zone associated with a piece of industrial equipment may not remain static and in fact may change in shape or size. A user of the method may manually update the danger zone associated with a piece of moving equipment, however in reality this may not be feasible, for example due to the potential of a number of different pieces of moving equipment. Therefore, the method may further comprise: providing an equipment locator device for location on the piece of equipment; transmitting radio ranging signals between the nodes and the equipment locator device; deriving measurements of times of flight of the radio ranging signals between the nodes and the equipment locator device; and calculating the location of the equipment locator device within the industrial environment based on the measurements of the times of flight of the radio ranging signals between the nodes and the equipment locator device and the reference information, and wherein the danger zone associated with the piece of equipment is defined with respect to the calculated location of the equipment locator device.

In this manner, through the provision of an equipment locator device, along with the above described transmission of radio ranging signals, it is possible to remotely determine the location of the piece of equipment and define the danger zone with respect to this determined position. This results in a method which can easily monitor moving equipment and adjust the associated danger zones. This may allow the danger zones in respect of a particular piece of equipment to be updated in real time, which is particularly important in order to ensure that personnel are warned of their presence in a danger zone.

In order to define the danger zone, in the industrial environment, in respect of the equipment provided with the equipment locator device, it will be necessary to have knowledge of the location of the equipment, along with the shape of the associated danger zone. Where the step of determining if the calculated location of a person is within a danger zone is performed on the personnel locator device, the personnel locator device will need to know the location of the danger zone of the equipment. The location and shape of the danger zone of the piece of equipment provided with the equipment locator device may be transmitted directly to the personnel locator device, or via one or more of the nodes. However, particularly for pieces of equipment which are frequently moved, transmission of the location and shape of the danger zone may be an intensive use of data transmission.

Therefore, the method may further comprise: before calculating the location of the equipment locator device, transmitting zonal information representing the shape of the danger zone associated with the piece of equipment to the personnel locator device over a radio communication system, and after calculating the location of the equipment locator device, transmitting the calculated location of the equipment locator device to the personnel locator device over the radio communication system. By transmitting the shape of the danger zone before calculating the location of the equipment locator device will mean that only the positional information of the equipment locator device needs to be transmitted to the personnel location device. This may reduce the amount of data which needs to be transmitted which may, advantageously, reduce the power consumption of the equipment locator device. Reducing the power consumption in this manner may be particularly advantageous in certain embodiments wherein the equipment locator device is battery powered as it may reduce the frequency that the battery has to be recharged or replaced.

The danger zone associated with a particular piece of equipment may depend, for example, on the operational state of the piece of equipment. For example, the danger zone may be increased when a piece of equipment is in operation, when compared to when it is not in operation. Therefore, the method may further comprise receiving control information associated with the piece of equipment, and the danger zone associated with the piece of equipment is dependent on the control information associated with the piece of equipment. Thus, it may be possible to adapt the danger zone depending on the control information, i.e. the operational state, of the piece of equipment. This may help to ensure that the danger zone more accurately reflect the actual danger area associated with a piece of equipment which may therefore free up area in the industrial environment as non-dangerous depending on the control information associated with a piece of equipment.

As described above, a piece of equipment may be provided with an equipment locator device, and the location of the piece of equipment in the industrial environment may be determined through the transmission of radio ranging signals between the equipment locator device and nodes. However, this may not be necessary in order to determine whether a person is within a danger zone associated with a particular piece of equipment.

The method may further comprise: providing an equipment locator device for location on the piece of equipment; transmitting radio ranging signals between the equipment locator device and the personnel locator device; deriving measurements of times of flight of the radio ranging signals between the equipment locator device and the personnel locator device; and determining if the personnel locator device is located within a danger zone defined with respect to the location of equipment locator device based on the measurements of times of flight of the radio ranging signals between the equipment locator device and the personnel locator device.

Accordingly, the relative separation of the personnel locator device and equipment locator device is determined without knowledge, or use of, the location of either of the personnel locator device or equipment locator device. This may advantageously permit the determination of whether a personnel locator device is in a danger zone even when the equipment locator device is unable to communicate with the nodes, e.g. through a fault or through design. Of course, this method of determining whether the personnel locator device is in the danger zone through direct ranging with the equipment locator device may be used in addition or alternatively to the method described above whereby the equipment locator device transmits radio ranging signals to the nodes in order for its position to be determined.

The step of transmitting radio ranging signals between the nodes and the personnel locator device may comprise transmitting outbound signals from the personnel locator device to the nodes and transmitting return signals from the nodes to the personnel locator device in response to the outbound signal; and the derived measurements are measurements of the total time of flight of the outbound signal and the return signal. Transmitting inbound and outbound signals in this manner and having derived measurements which are the total flight time may advantageously allow the distance between the personnel locator device and the nodes to be more accurately determined as an average of the inbound and outbound time of flights may be used to determine the distance which may be more accurate than just an inbound or outbound measurement of time of flight.

Alternatively, the step of transmitting radio ranging signals between the nodes and the personnel locator device may comprise transmitting an inbound signals from the nodes to the personnel locator device; the derived measurements are measurements of the times of flight of the inbound signals. Whilst this may not necessarily be as accurate as the method described above involving determining the total flight time of an inbound and outbound flight time, it may beneficially reduce the total time taken to calculate the location of a personnel locator device. This will thus reduce the time taken to determine whether the personnel locator device is located in a danger zone. Reducing the time taken to determine whether the personnel locator device is in a danger zone may allow a user of the method to more quickly be alerted if a person provided with the personnel locator device enters a danger zone. Remedial action may then be taken earlier and further danger may be prevented. This speed of determination will become more beneficial when the person provided with the personnel locator device is moving more quickly.

The radio ranging signals may be ultra-wideband signals. Such signals may be substantially unimpeded in an industrial environment.

The devices and nodes may communicate with one another in any suitable manner such that each of the respective devices and nodes is able to determine which device or node it is in communication with. The radio ranging signals may be transmitted from different devices and nodes in time slots allocated to respective devices and nodes. This communication arrangement may provide a relatively simple and efficient means for communication between the devices and nodes. This particular form of communication may be considered to be equivalent to time-division multiplexing.

The more accurate the calculation of the location of the personnel locator device, the more definitively a user will be able to determine whether the personnel locator device is located in a danger zone. Therefore, the step of calculating the location of the personnel locator device within the industrial environment may comprise calculating the location that minimises an error between the measurements of times of flight. Through a minimisation of the error between the measurements of times of flight it may be possible to more accurately determine the location of the personnel locator device.

The personnel locator device may comprise an inertial measurement unit and the step of calculating the location of the personnel locator device within the industrial environment takes account of the output of the inertial measurement unit. Through the use of an inertial measurement unit as part of the personnel locator device the accuracy of the calculation of the location of the personnel locator device may also be improved, again ensuring that the most accurate information is used when determining whether the personnel locator device is in a danger zone.

As mentioned above, improving the accuracy in calculating the location of the personnel locator device is beneficial. The nodes may be arranged to detect the angle of arrival of the radio ranging signals, and the step of calculating the location of the personnel locator device within the industrial environment takes account of the detected angle. Through accounting for the detected angle of arrival of the radio ranging signals, it may be possible to more accurately calculate the location of the personnel locator device. Detection of the angle of arrival of the ranging signals may be achieved through any appropriate means. For example, each node may comprise multiple transceivers appropriately spaced apart from one another to enable determination as to the angle of arrival.

Whilst constant calculation of the location of a personnel locator device, and subsequent determination of whether the calculated location falls within one or more danger zones may provide a method which is constantly capable of quickly outputting a warning signal when a person enters a danger zone, this may not always be necessary. In fact, constant calculation and determination may consume a large amount of power, which is particular relevant as the personnel locator device may be a battery powered device. A frequent need to replace or recharge the battery of the personnel locator device may reduce a person's compliance with the method. Therefore, the method may further comprise determining if the calculated location of personnel locator device falls within one or more safe zones within the industrial environment represented by the zonal information and ceasing performance of the method in response thereto. This method may, therefore, in embodiments in which the calculating of location and/or determining of presence in a danger zone are carried out on the personnel locator device, reduce the power consumption of the personnel locator device. This may therefore increase the operational time of the personnel locator device which may help increase compliance with the method.

In accordance with a second aspect of the present invention, there is provided a safety sensing system for a person in an industrial environment, the system comprising a personnel locator device for location on a person and a plurality of nodes located at predetermined locations in the industrial environment, the system being arranged to: transmit radio ranging signals between the nodes and the personnel locator device; derive measurements of times of flight of the radio ranging signals; calculate the location of the personnel locator device within the industrial environment based on the measurements of the times of flight of the radio ranging signals and reference information representing the predetermined locations of the nodes; and determine if the calculated location of personnel locator device falls within one or more danger zones in the industrial environment represented by zonal information and output a warning signal in response thereto.

The apparatus in accordance with the second aspect of the invention may therefore implement a similar method to the first aspect of the invention, and so carries the same advantages. The features of the first aspect of the invention described above may similarly be applied in the second aspect of the invention.

In accordance with a third aspect of the present invention, there is provided a personnel locator device for use in a safety sensing system comprising a plurality of nodes located at predetermined locations in the industrial environment, the personnel locator device being for location on a person and being arranged to: derive measurements of times of flight of radio ranging signals transmitted between the nodes and the personnel locator device; calculate the location of the personnel locator device within the industrial environment based on the measurements of the times of flight of the radio ranging signals and reference information representing the predetermined locations of the nodes; and determine if the calculated location of personnel locator device falls within one or more danger zones in the industrial environment represented by zonal information and output a warning signal in response thereto.

The personnel locator device in accordance with the third aspect of the invention may therefore implement a similar method to the first aspect of the invention, and so carries the same advantages. The features of the first aspect of the invention described above may similarly be applied in the third aspect of the invention.

The various aspects of the disclosure and preferred features thereof may be combined in any combination.

BRIEF DESCRIPTION OF THE DRAWINGS

Embodiments of the present disclosure will now be described by way of non-limitative example with reference to the accompanying drawings, of which

FIG. 21 is a diagram illustrating the geometry of a broadcast block packet containing zonal information.

DETAILED DESCRIPTION

All the aspects of the present disclosure may be applied in a hazardous working environment such as a drill floor, deck or on a rig for drilling and extracting hydrocarbons.

Figure 1:
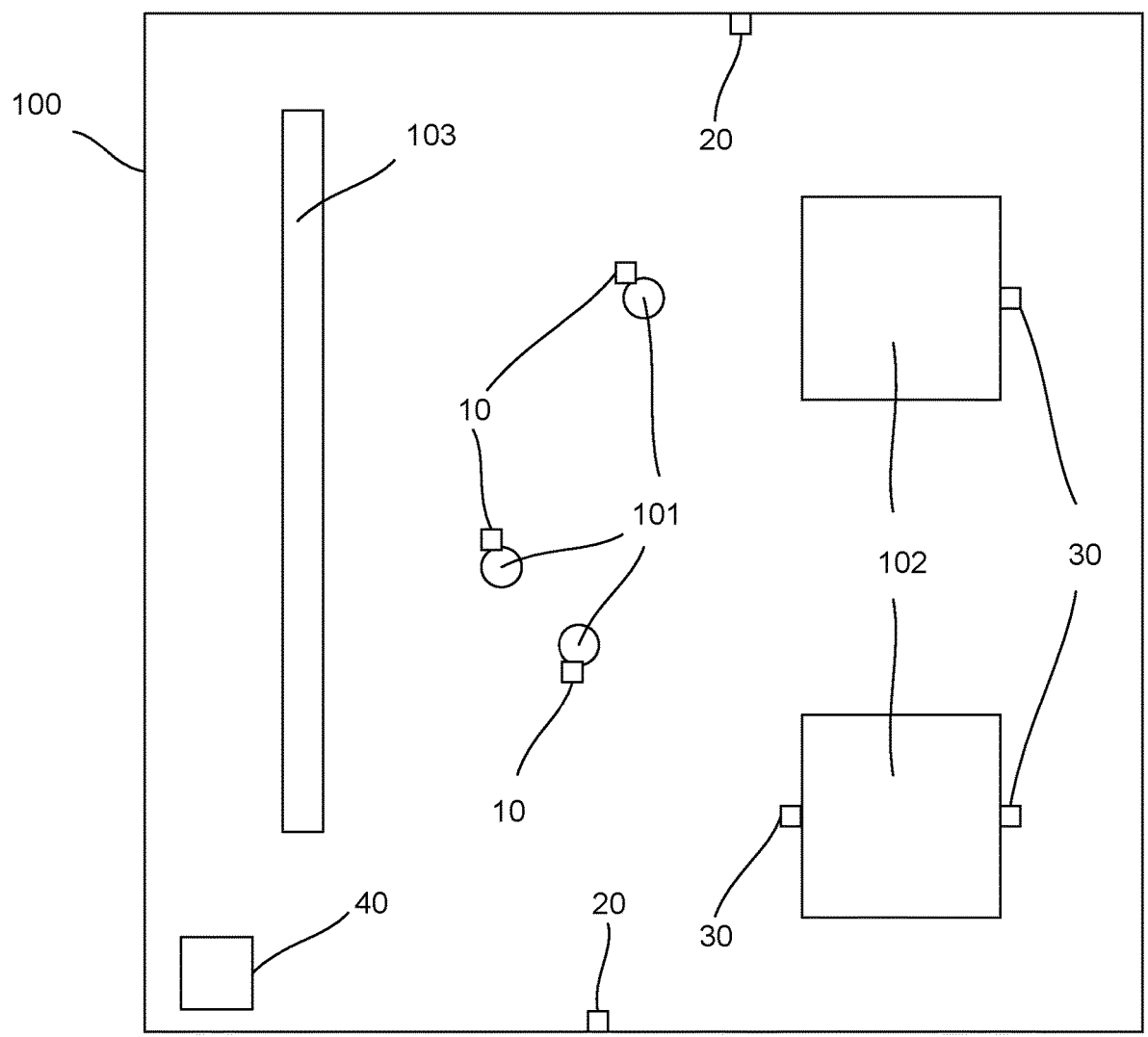
FIG. 1 is a schematic diagram of a safety sensing system implemented in an industrial environment.

In all aspects of the present disclosure, a device worn by a person may be incorporated into suitable clothing such as a vest, coat, personal protective equipment, footwear, gloves, head-gear, collars, epaulettes, buttons, belts or shoe-laces. FIG. 1 shows a schematic diagram of a safety sensing system implemented in an industrial environment 100 which illustrates ranging and position location techniques employed by the safety sensing system. The industrial environment includes people 101, equipment 102 and other features 103. The equipment 102 may be machinery or moving apparatus that represents a hazard to the personnel 101. The other features 103 may be stationary objects or walls that do not represent a hazard to the people 101. At least one of the people 101 within the industrial environment 100 may wear or otherwise carry a personnel locator device 10 designed for location on a person. A danger zone may be associated with a piece of equipment 102 located in the industrial environment. At least one of the pieces of equipment 102 within the industrial environment 100 may have an equipment locator device 30 attached. The system comprises a reference system comprising a plurality of gateways 20 which may be located at predetermined locations in the industrial environment 100 and a control device 40 which may also be located in the industrial environment 100.

Figure 2:
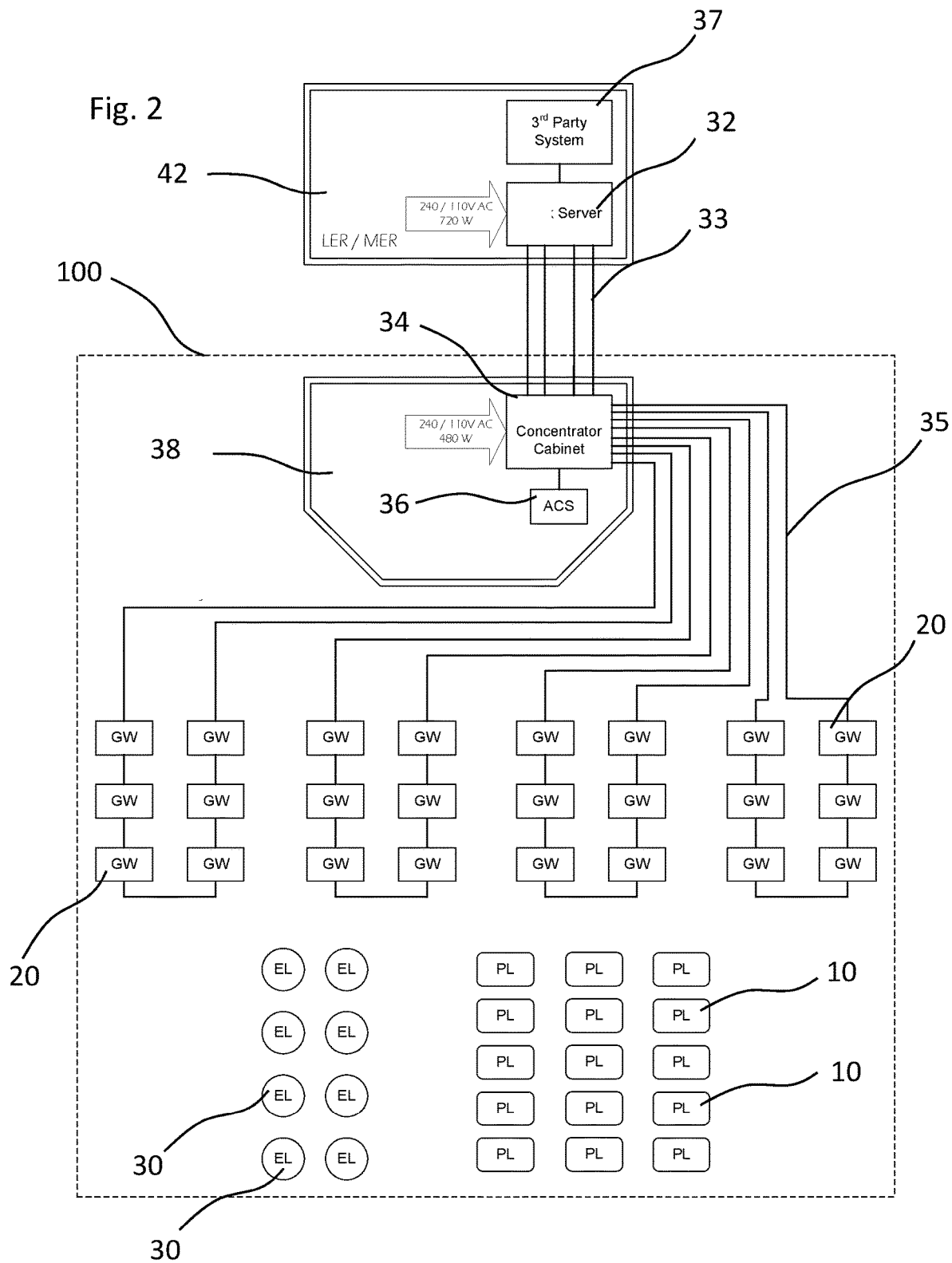
FIG. 2 is a schematic diagram showing the topology of a safety sensing system.

FIG. 2 shows a fully connected safety sensing system which is an example of that shown in FIG. 1.

The safety sensing system comprises a number of personnel locator (PL) devices 10 and a number of equipment locator (EL) devices 30 which may operate in a mode in which they attempt to calculate their own location. Each of these PL devices 10 and EL devices 30 operating in this mode may be referred to as a 'tag'.

A server 32 and a Concentrator Cabinet 34 together form the control device 40 of the reference system as shown in FIG. 1. There are four EtherCAT loops which connect from the server 32 via the Concentrator cabinet 34. The server 32 and the concentrator cabinet 34 together form the control device 40 in this example. The server 32 is a standard x86 rack mounted server. This server 32 runs the software which communicates with all the devices in the network via EtherCAT and a 2.4 GHz sideband network which will be described in more detail with reference to later drawings. The server 32 may also interface with a third party system 37.

The Concentrator Cabinet 34 holds the media convertor, which interfaces the server 32 with an EtherCAT network 33, which may comprise four EtherCAT loops, or alternatively fibre optic cables. The Concentrator Cabinet 34 provides Power over Ethernet 35 to the gateways 20.

The gateways 20 function as nodes by operating in a mode where it is providing a positional reference for the PL devices 10 and the EL devices 30. The gateways 20 would normally operate in this mode, and any EL devices 30 may also operate in this mode as a node when it has an associated zone attached to it.

Danger, or 'Alarm', zones are configured via an Alarm Control System (ACS) 36, which is a GUI interface to the server 32. This GUI displays a map of the current tag (e.g. PL devices 10 and/or EL devices) 30 locations and allows the operator to edit and view alarm zones.

As can be seen in FIG. 2, a number of 'Safe Zones' 38, 42 are defined. The safe zone 38 is in the form of a drillers cabin in which the concentrator cabinet 34 and ACS 36 are located. These are zones in which there is minimal, or no danger.

Figure 3:
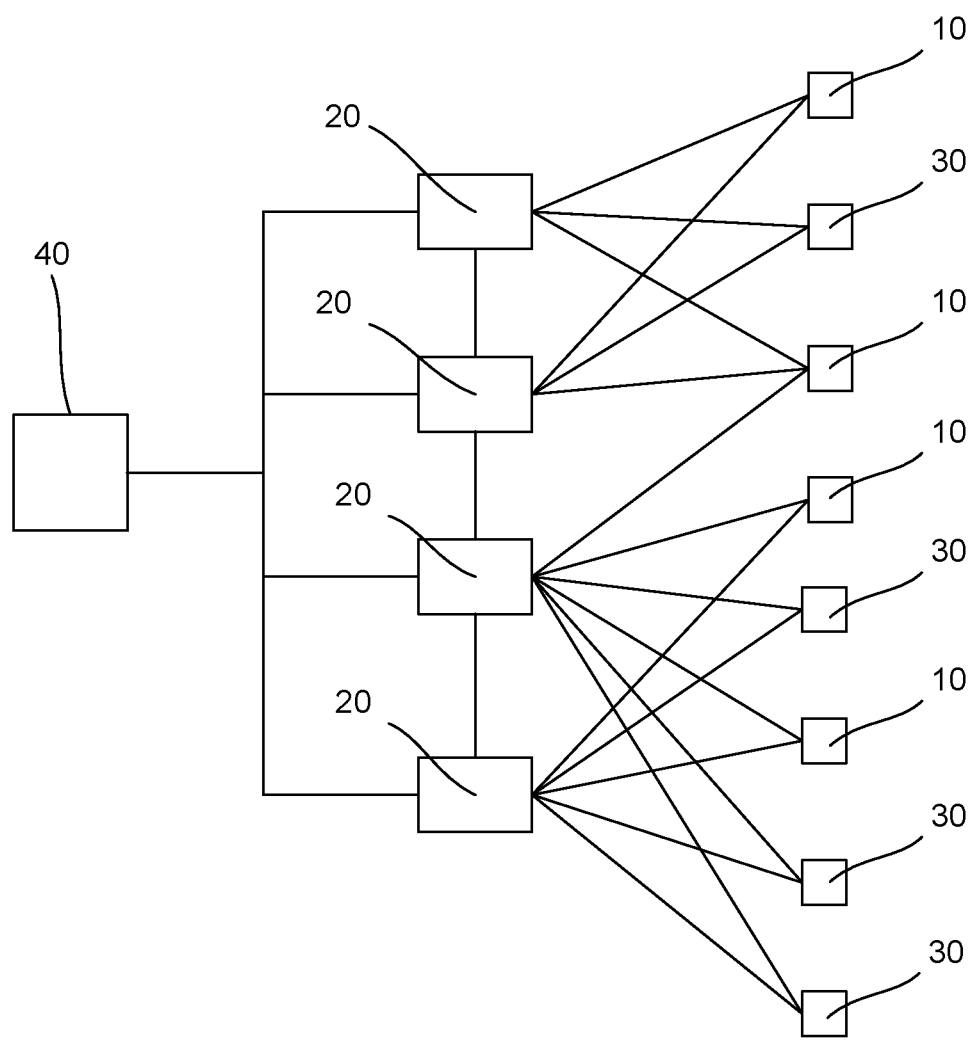
FIG. 3 is a schematic diagram of a network in an industrial environment.

FIG. 3 shows a schematic diagram of the connections between the network located in the industrial environment 100. The control device 40 may be in communication with each of the gateways 20 for example over a wired network as described above with respect to FIG. 2. Each of the gateways 20 may be in communication with one or more of the other gateways 20 over a wired network and with one or more of the personnel locator devices 10 and equipment locator devices 30 over a wireless communication network.

A safety sensing method for locating a person 101 in an industrial environment 100 comprises measuring the times of flight of signals between a personnel locator device 10 located on the person 101 and a wireless network, the wireless network comprising a plurality of gateways 20 located at predetermined locations in the industrial environment 100. The personnel device 10 and gateways 20 are discussed in greater detail below. The location of the person 101 within the industrial environment 100 can be determined based on the transmission radio ranging signals between the gateways 20 and the personnel locator device 10. Following transmission, measurements of the times of flight of the radio ranging signals between the gateways 20 and personnel locator device 10 may be derived.

Following this, the method comprises calculating the location of the personnel locator device 10 within the industrial environment 100 based on the measurements of the times of flight of the radio ranging signals between the gateways 20 and the personnel locator device 10 and reference information representing the predetermined locations of the gateways 20.

Once the location of the person 101 within the industrial environment 100 has been determined, the method involves determining if the calculated location of the personnel locator device 10 is within one or more danger zones in the industrial environment and outputting a warning signal in response thereto. The danger zone is discussed in greater detail below.

Figure 4:
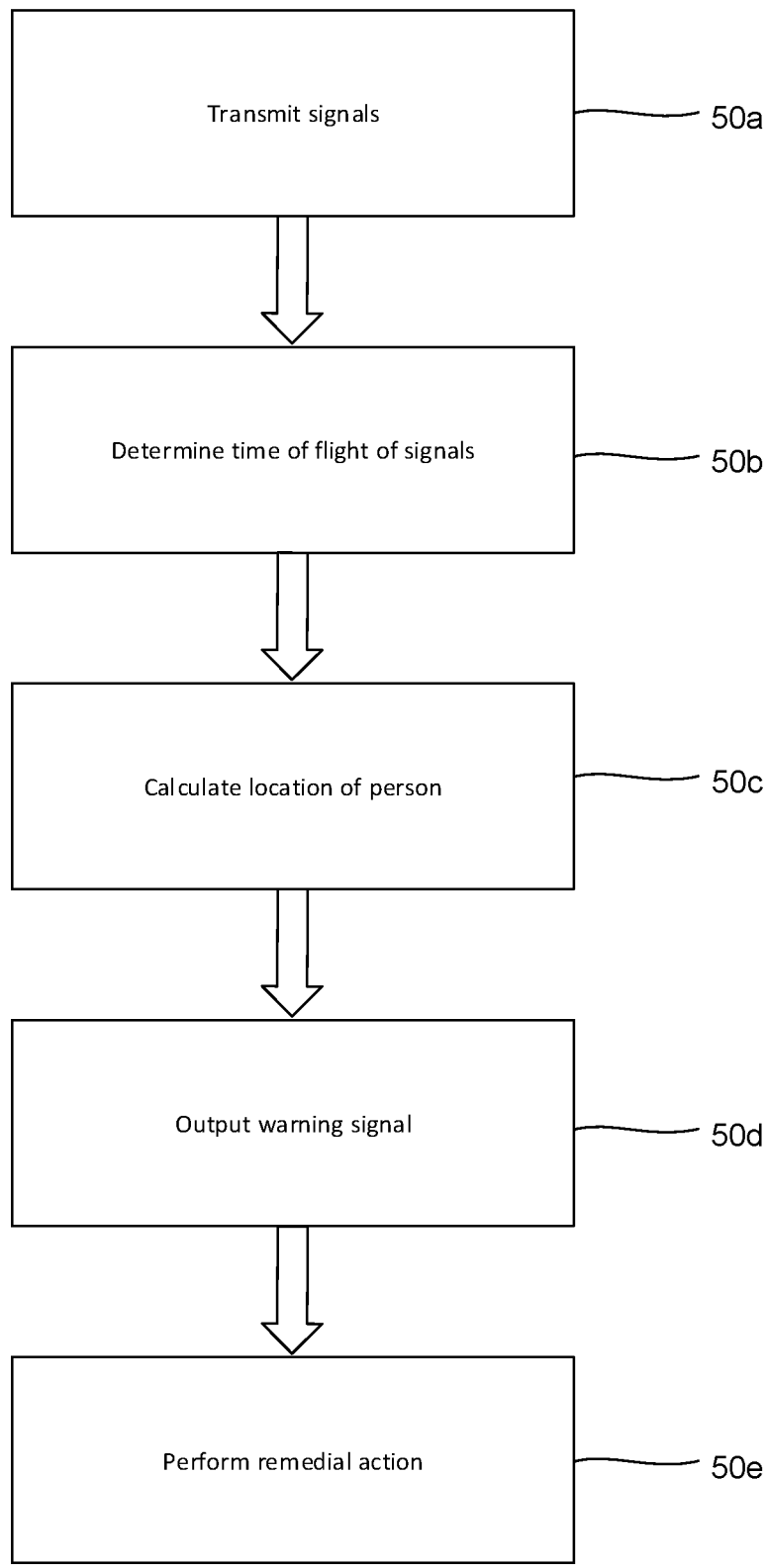
FIG. 4 is a diagram of the steps performed to determine the location of a person.

An example of such a safety sensing method for a person in an industrial environment is shown in FIG. 4 and performed as follows.

Figure 5:
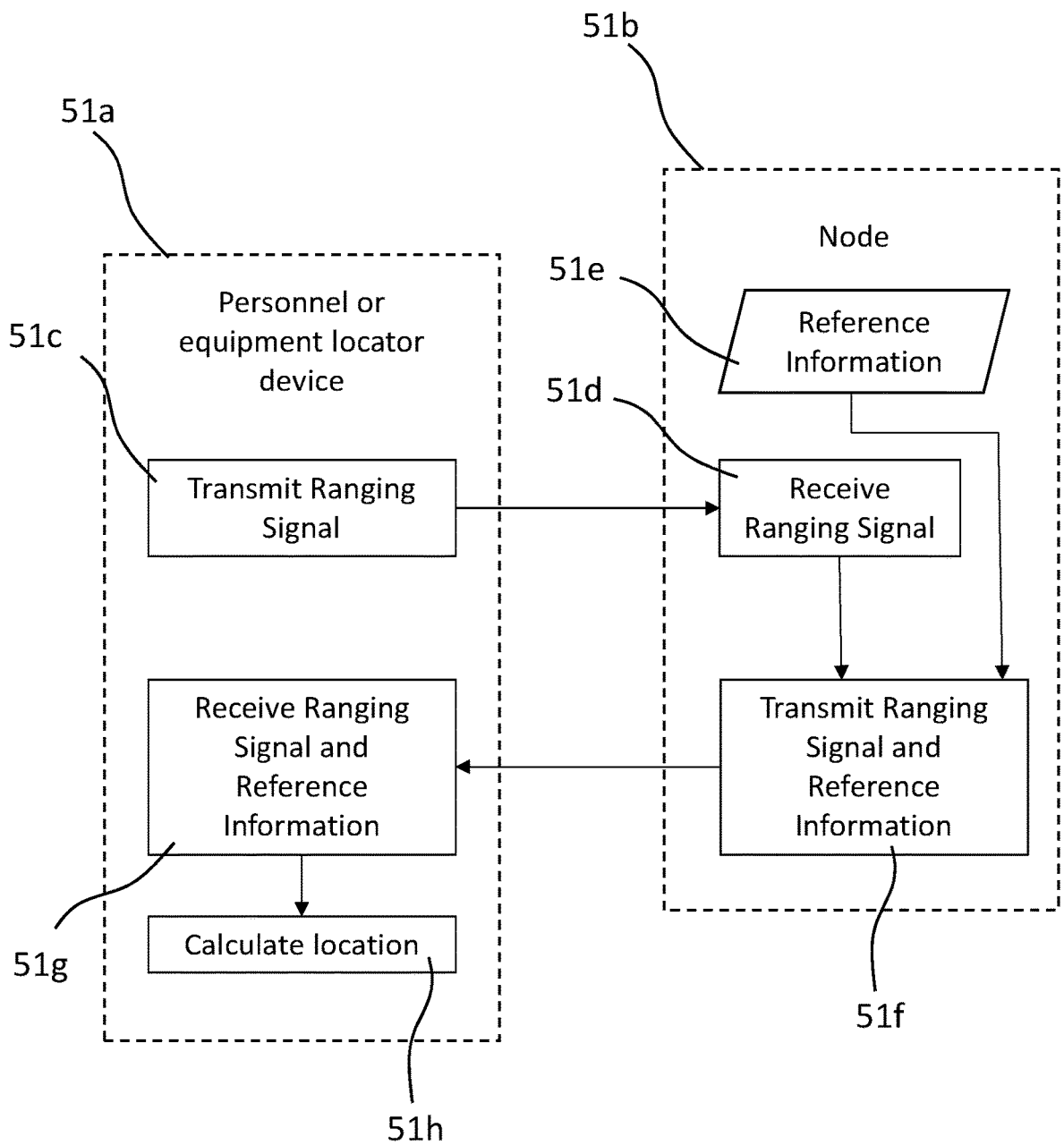
FIG. 5 is a diagram illustrating a specific example of steps 50a-c shown in FIG. 4.

In step 50a, the signals are transmitted between the personnel locator device 10 and the wireless network. This may involve communicating the reference information to the personnel locator device 10 as seen in FIG. 5.

In step 50b, the step of deriving measurements of the times of flight of the radio ranging signals in respect of respective gateways 20 is performed, which may be performed in the personnel locator device 10.

In step 50c, the distances travelled by the signals and thus the location of the personnel locator device 10 (and therefore the person 101 to which the personnel device may be attached) within the industrial environment 100 may be determined. The step of determining if the calculated location of the person 101 is within one or more danger zones may then be performed in the personnel locator device 10. Alternatively, the step of determining if the calculated location of the person 101 is within one or more danger zones may be performed in the reference system, e.g. in one of the gateways 20 or on the control device 40.

If this location falls within a danger zone in the industrial environment 100, a warning signal is output in step 50d. The warning signal may be communicated from the personnel locator device 10 to the reference system. Alternatively, the warning signal may be communicated from the reference system to the personnel locator device 10.

Optionally, remedial action may be taken based on the output of the warning signal in step 50e. For example, the reference system, e.g. the control device 40 or gateways 20, may provide an audible or visible alert to a user in response to the warning signal. Alternatively the personnel locator device 10 may provide an audible or visible alert in response to the warning signal. The remedial action may include the reference system causing operation of equipment within the industrial environment 100 to cease in response to the warning signal. The remedial action may alert the person 101 or a supervisor monitoring the control device 40. The remedial action may involve providing a haptic, visual or audible alarm to the person 101 or the supervisor monitoring the control device. For example, the remedial action may be the activation of a klaxon or strobe light mounted in the industrial environment 100. The remedial action may involve the operation of equipment emergency stops or interlocks. The steps described above may be performed in any appropriate order, and not necessarily the order in which they are presented above.

FIG. 5 shows a flow chart of a specific example of steps 50a-50c seen in FIG. 4. The box encompassed by the dashed line 51a represents processes that are carried out, or information that is held, on the personnel locator device 10 or the equipment locator device 30. The box encompassed by the dashed line 51b represents processes that are carried out, or information that is held, on the node, e.g. a gateway 20.

In step 51c a radio ranging signal is transmitted from the PL device 10 or EL device 30. This radio ranging signal is received on the node in step 51d.

The node also has reference information 51e, for example information relating to the location of the node, stored thereon. Following receipt of the radio ranging signal at step 51d, the node may then, transmit a return radio ranging signal 51f along with the reference information back to the PL device 10 or EL device 30. The reference information in this example is transmitted to the PL device 10 or EL device 30 as part of the radio ranging signals, although alternatively it could be transmitted over a separate radio communication system.

The return ranging signal may be received by the PL device 10 or EL device 30 at step 51g. Steps 51c, 51d, 51f and 51g may be considered together to form part of step 50a seen in FIG. 4.

Following receipt of the return ranging signal at step 51g, the time of flight of the ranging signals may be determined as an integral part of step 51g. Step 51g may therefore also correspond to step 50b seen in FIG. 4.

The location of the PL device 10, or EL device 30, may then be calculated on the PL device 10, or EL Device 30 itself in step 51h. The steps described above may be performed in any appropriate order, and not necessarily the order in which they are presented above.

Figure 6:
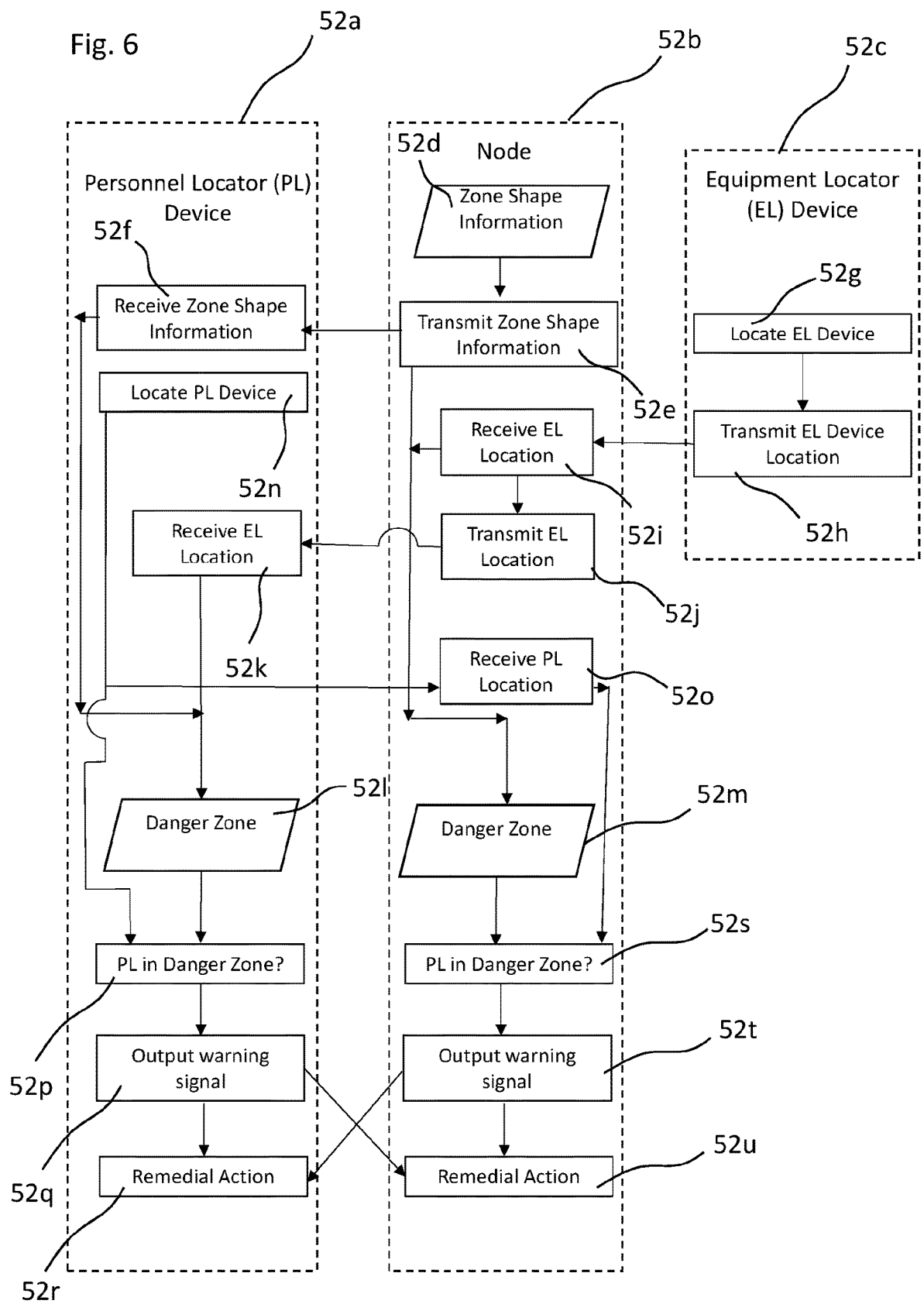
FIG. 6 is a diagram illustrating a specific example of steps 50a-50e in seen in FIG. 4.

FIG. 6 shows a flow chart providing further detail regarding method steps 50c-50e. Dashed boxed 52a, 52b, and 52c each represent processes and information which are carried out or stored on the personnel locator device 10, the nodes, e.g. gateways 20, and equipment locator device 20, respectively. The node store zone shape information 52d which is information related to the shape of danger, and optionally safe, zones which may be present in the environment 101. This zone shape information 52d is transmitted to the PL device 10 at step 52e, and received by the PL device 10 at step 52f.

At step 52g the location of the EL device 30 is calculated on the EL device 10. This may be achieved using the process shown in FIG. 5. Following calculation of the location of the EL device 30, its location is transmitted to the node in step 52h, and received by the node in step 52i. The location of the EL device 30 is then also transmitted from the node to the PL device 10 at step 52j and received at step 52k.

Following step 52k, the location of the EL device 10 may be fed into danger zone information 52l information on the PL device. The Zone shape information received at step 52f may also be fed into this danger zone information 52l. A similar process may also occur on the node, whereby the zone shape information may be fed into the danger zone information 52m along with the EL device 30 location received at step 52i. In the instance where a danger zone is associated with a piece of equipment 102, the location of the EL device 30 may be used in conjunction with the zone shape information to define a danger zone. In addition or alternatively, where danger zones are predefined within the environment 101 irrespective of the location of equipment 102, danger zones may be defined using the zone shape information 52d alone, at least for zone shape information 52d that has a reference location.

The PL device 10 may also perform a location step 52n comprising steps 50a-5c shown in FIG. 4 and steps 51c to 51h seen in FIG. 5. Once the location of the PL device 10 has been calculated in step 52n, this information may be transmitted and received by the node at step 52o. The PL device 10 may then, using the location of the PL device 10 calculated at step 52n, and the danger zone information 52l determine whether the PL device 10 is in a danger zone in step 52p. Assuming that the PL device 10 is determined to be in a danger zone, an output warning signal may be generated at step 52q. Remedial action may then be performed on the PL device at step 52r.

In addition or alternatively, the node may, using the location of the PL device received in step 52o, and the danger zone information 52*m*, determine whether the PL device 10 is located in a danger zone in step 52*s*. Assuming it is determined that the PL device 10 is determined to be in a danger zone, an output warning signal may be generated at step 52*t*. This warning signal may cause remedial action to be performed on the node at step 52*u*.

When the warning signal is output on the PL device 10 in step 52*q*, the warning signal may alternatively, or in addition, be transmitted to the node and remedial action at step 52*u* may be performed on the node in response to receipt of the warning signal on the PL device 10. Similarly, when the warning signal is output on the node in step 52*t*, the warning signal may alternatively, or in addition, be transmitted to the node and remedial action at step 52*r* may be performed on the PL device 10 in response to the receipt of the warning signal generated on the node. This may therefore mean that a determination as to the presence of a PL device 10 may only need to be carried out on the PL device 10 itself, or the node, whilst at the same time maintaining the ability for both the PL device 10 and the node to take remedial action. Of course, the node itself may not take remedial action and instead the remedial action may occur on the control system 40.

Of course the communication of the information in the steps described above may be included as part of the radio ranging signals or alternatively over a separate radio communication network. Additionally, the steps described above may be performed in any appropriate order, and not necessarily the order in which they are presented above.

The method described above with respect to FIG. 6 involves determining the location of the equipment locator device 30. However, in certain instances this may not be possible or necessary.

Figure 7:
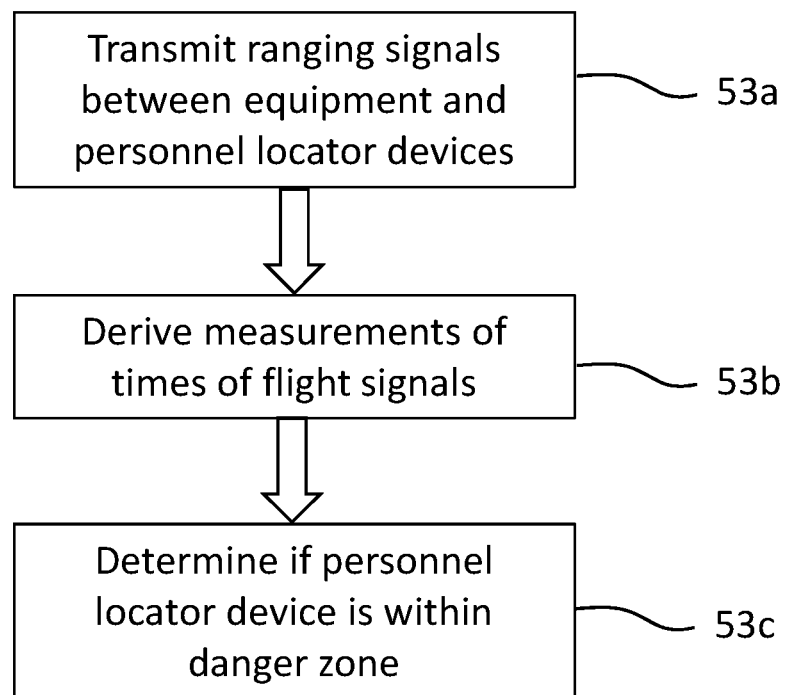
FIG. 7 is a diagram of the steps performed during ranging between personnel and equipment locator devices.

FIG. 7 illustrates a further method whereby the actual location of the equipment locator device 30 is not calculated, nor required, in order to determine whether the personnel locator device 10 falls within a danger zone associated with the equipment locator device 30. In this method, again a piece of equipment 102 is provided with an equipment locator device 30. In step 53*a* radio ranging signals are transmitted between the equipment locator device 30 and the personnel locator device 10.

In step 53*b*, measurements of times of flight of the radio ranging signals between the equipment locator device 30 and the personnel locator device 10 are derived. In step 53*c*, it is determined whether the personnel locator device 30 is located within a danger zone defined with respect to the location of equipment locator device 10 based on the measurements of times of flight of the radio ranging signals between the equipment locator device 30 and the personnel locator device 10. This method may, for example, measure the distance between the personnel locator device 10 and the equipment locator device 30 and determines whether this distance is below a certain distance and if so, determine that the personnel locator device 10. A danger zone may, for example, be defined as a sphere around an equipment locator device 30. Following a determination that the personnel locator device 10 falls within a danger zone, appropriate remedial action may be taken as described above with respect to FIG. 4.

The methods described above may be advantageous as the remedial action in response to the warning signal can be used to alert the person 101 to a hazard in the industrial environment 100 that they were not aware of. The remedial action may be used to directly alert the person 101 to the presence of the hazard. For example, the remedial action may comprise an audible alarm. The warning signal may also be provided to the control device 40 that interfaces with the wireless network. The supervisor monitoring the control device 40 may then alert the person 101 to the presence of the hazard or take other action such as shutting down machinery.

The wireless network and personnel device 10 may communicate using high or low frequency radio wave communication. The wireless network may be an ultra-wide band network such that the radio ranging signals are ultra-wideband signals. Low frequency radio wave communication may provide the advantage that communication is less affected by the presence of machinery, tubular or other steel obstructions in the industrial environment 100 that may attenuate or reflect the signal. Alternatively, other forms of communication may be used.

The various steps of the method may in general be performed on any one of the personnel locator device 10, the plurality of gateways 20, the equipment locator device 30 and the control device 40 in any combination.

Where subsequent processing steps are performed on different devices, then the result of one processing step may be communicated to another device using the wireless or wired communication networks in order to perform the next step. For example, the calculation of the time of flights of the signals may be performed on one of the plurality of gateways 20 and the result of the calculation may be transmitted to another one of the plurality of gateways 20 to calculate the distance between the devices associated with the signals and the location of the personnel device.

The distribution of the steps between the devices may be selected based on a number of practical considerations such as reliability and redundancy, and the available power and processing capability on the different devices.

The personnel locator devices 10, gateways 20 and equipment locator devices 30 may each comprise a radio ranging transceiver which is based on the same hardware and firmware. Such radio ranging transceivers can be seen in FIGS. 16-19. The radio ranging transceivers may comprise two broad classes of operation that the installed firmware provides; Tag (ranging initiator—normally personnel locator device 10 or equipment locator device 30 EL) or Node (ranging responder—normally gateways 20).

The tag function is that most commonly used by portable radios, and the node function is most commonly used by static devices which provide a location reference.

Figure 8A:
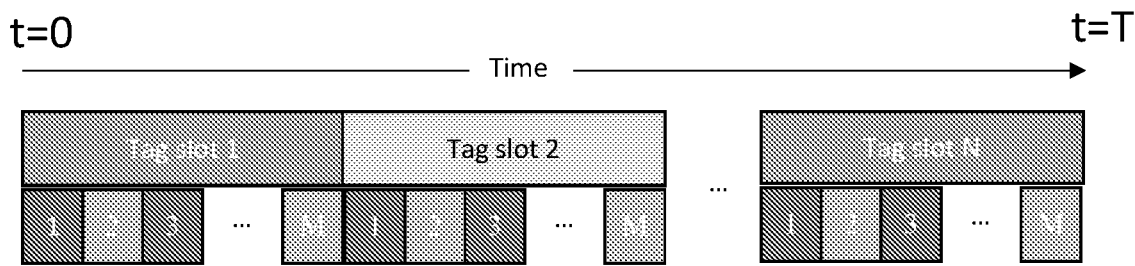
FIGS. 8A and 8B show timing diagrams for time-division multiple access communication between nodes and tags.

The radio ranging signals may be transmitted from different devices, e.g. PL devices 10, EL devices 30 and gateways 20 in time slots allocated to respective devices, e.g. PL devices 10, EL devices 30 and gateways 20. The tag and node functions may have individual time-division multiple access (TDMA) time domains, within which they are permitted to communicate. This is illustrated in FIG. 8A. The tag, e.g. personnel locator device 10 or equipment locator device 30, TDMA domain has N slots per a given time period T, and the node, e.g. gateway 20, TDMA domain has M slots over the time period of a single tag slot, therefore there are N*M node time slots contained in T. When a non-zero tag slot number is allocated to a device, e.g. a personnel locator device 10 or equipment locator device 30, it operates as a tag in that slot. When a non-zero node slot is allocated to a device, e.g. a gateway 20, it operates as a node in that slot, for every tag slot other than that that it has been allocated for operation as a tag. This means that if a device has a tag slot allocation n and a node slot allocation m, the device will operate as a node in all N tag slots other than n. If a device is allocated a node slot but no tag slot, it will act as a node in all N tag slots.

The network is synchronized using a master node which broadcasts synchronization packets on a pre-allocated time slot. All tag TDMA timeslots are clocked from the receipt of the master node's synchronization packet.

Tags, e.g. PL devices 10 or EL devices 30, will be allocated slots upon completion of a 'sign in' activity, for example holding against an NFC coil. The tag will initiate the slot allocation by sending a simple slot allocation request message to the central control device 40. Upon receipt of this message, the control device 40 will send a message containing the slot number to be used to the tag. Deallocation of slot numbers occur when the tags are plugged into the charging station, which is considered a 'sign-out' activity. In this case the tag reports back to the central control device 40 that its slot number has changed to zero, which causes deallocation of that slot number for that tag.

Communication failures after a set time (say, 60 minutes) will cause an automatic deallocation of the slot number at the central control device 40. If the tag, e.g. PL device 10 or EL device 30, regains connection after that, the tag must be signed in again. The tag will inform the user of this situation using visual and audible alarms.

The master node, e.g. gateway 20, broadcasts also provide clock synchronization information, i.e. a synchronization packet, which are used to discipline the remote radio clocks to that of the master node, providing a common reference time base between all devices e.g. PL devices 10, EL devices 30 and gateways (master clock). The clock source on the master node is a temperature compensated crystal oscillator (TCXO) which is used as the clock source for the on-board processor.

Figure 9:
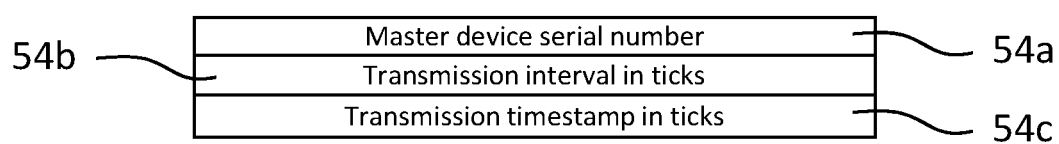
FIG. 9 shows the form of a synchronization packet.

The format of the synchronization packet is illustrated in FIG. 9 and includes the following data. The master device serial number 54a is the serial number of the clock master, the transmission interval 54b and transmission timestamps 54c are given in ticks, where a tick is approximately 15.65 picoseconds. To synchronise a receiver clock with these messages, a count is kept on the receiver which times the local clock interval. This is compared with the difference between transmission timestamps from the sequence of synchronization packets, which is used to create a ratio between local and master clock domains. This is then applied to all timestamps in the local clock domain to convert to the master clock domain.

As any of the tags, e.g. any of the PL devices 10 or EL devices 30, can act as nodes in other time slots, there is a secondary ability for a tag to find its distance to any other tag by temporarily setting up the other tag as a node. The catalogue of ranges from tag to node devices collected during the ranging exchange would therefore contain the tag to tag ranges. Therefore, danger zones could be set up contingent on the location of tags, e.g. EL devices 30, attached to moving equipment 102, which could be processed locally, at low latency, without recourse to sideband communications channels.

A device, e.g. PL devices 10 or EL devices 30 operating as a tag on tag slot number n (where $1 \leq n \leq N$) runs normal tag operations on timeslot n, i.e. transmitting a range broadcast request as per step 1 of the ranging exchange process discussed below, it then continues through the ranging exchange during timeslot n only. For all other tag timeslots r≠n, the device listens to broadcast from other tags as a normal node with a node slot number m.

Figure 8B:
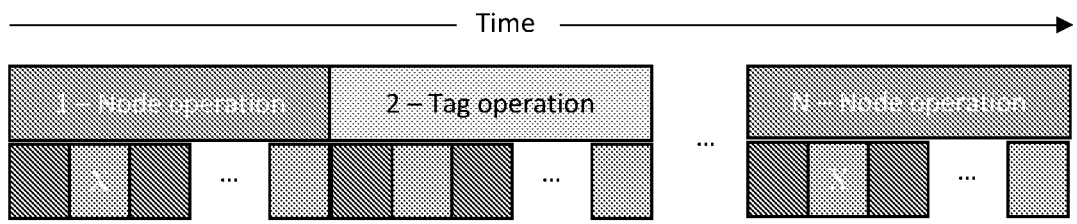

With reference to FIG. 8B, the device behaves as a node in the for all the timeslots in the top row except for n and it replies on all corresponding m timeslots in the bottom row, except for in the m timeslot under the top row timeslot n, where it is not available as a node (if it were, it would simply be ranging to itself). FIG. 8B shows this operation, an 'X' in the bottom row denotes the device replying to another tag.

Due to the structure of the timeslots in the network, a tag can operate as a node in other timeslots without impacting the ranging between other tags and other nodes. It will, however count towards the total number of supported tags and nodes in the network, for example, if a network supporting sixteen nodes, e.g. gateways 20, is operating with all those nodes present, one of the nodes would have to cease operations as a node to allow the tag to use its node timeslot. Additionally, as the location of a tag is, by definition, not a priori known to the network, other tags should be aware of this fact with either a reserved node range or flag transmitted in the node reply to other tag ranging exchanges. The method of determining the location of a person 101 and/or a piece of equipment 102 in the industrial environment 100 may include transmitting radio ranging signals between the gateways 20 and the personnel locator device 10 and/or an equipment locator device 30 which comprises transmitting a first, for example outbound, signal between the personnel device 10 and/or an equipment locator device 30 and the plurality of gateways 20, transmitting a second, for example return, signal between the plurality of gateways 20 and the personnel device 10 and/or an equipment locator device 30 in response to the first signal and wherein the derived measurements are measurements of the total time of flight of the first, outbound, signal and the time of flight of the second, return, signal. In this example, the calculation of the distances between the components and the position of the personnel locator device 10 and/or an equipment locator device 30 may take place on the personnel device 10 and/or an equipment locator device 30. There may be a processing delay between the receipt of the first signal by either of the personnel device 10 and/or an equipment locator device 30 and the plurality of gateways 20 and transmission of the second signal from the personnel device 10 and/or an equipment locator device 30 and the plurality of gateways 20. The length of the processing delay may be a known length that depends on the processing components of the personnel device 10 and/or an equipment locator device 30 or the plurality of gateways 20.

A more detailed explanation of the ranging process described above now follows. When a device, e.g. a personnel locator device 10 or an equipment locator device 30, operating as a tag detects that it is within its TDMA timeslot, with respect to the master node, e.g. a gateway 20, it initiates a ranging exchange with all the node devices it can see. The ranging exchange proceeds as follows:

1. At the start of the timeslot, the tag transmits a packet which is broadcast to all node devices in range and records the transmit timestamp in the master clock domain. This corresponds to step 51c in FIG. 5.
2. Each node which receives the request schedules a response to be transmitted at a precise time in future, which is at the start of its allocated node slot m. This corresponds to steps 51d FIG. 5
3. Each node adds receive and (future) transmit timestamps to the transmit packet in the master clock domain.
4. Each node adds its current location to the transmit packet. The current location corresponds to the reference information 51e in FIG. 5
5. At the scheduled response time, the packet is transmitted to the tag. When the tag receives the packet, it records the received timestamp in the master clock domain. These steps correspond to steps 51f and 51g in FIG. 5.

6. The tag uses the difference between its recorded transmit and receive times and those on the received packet to calculate a range to the node that transmitted the response. This step may be performed as part of steps 51g or 51h in FIG. 5
7. At the end of the tag TDMA timeslots, the tag has a list of path distances and locations from every node which responded. Extra information, including the received signal strength may also recorded for each received response.

Figure 10:
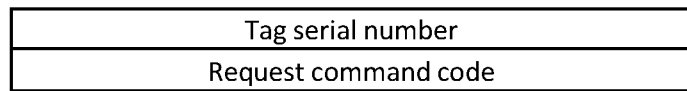
FIG. 10 shows the form of a request packet.
Figure 11:
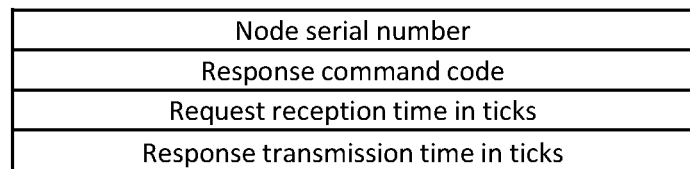
FIG. 11 shows the form of a response packet.

FIGS. 10 and 11 show the formats for the request and response packets respectively.

Figure 12:
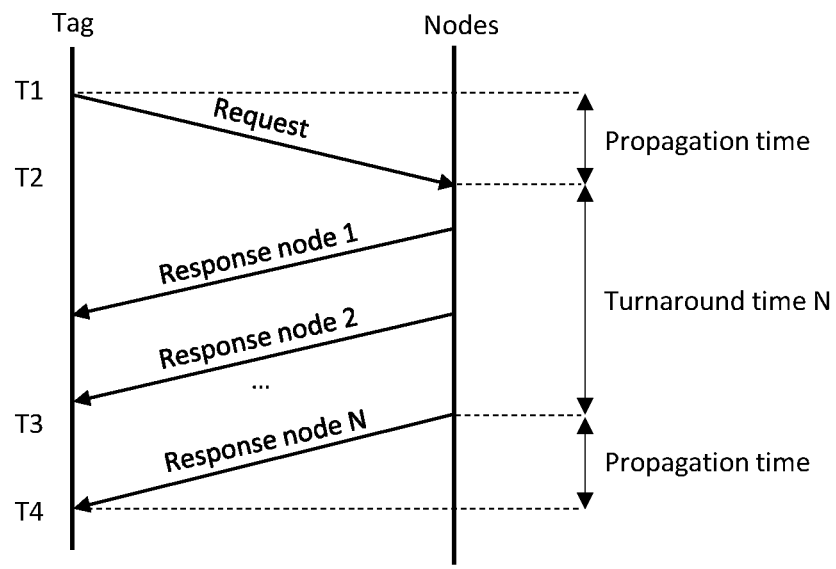
FIG. 12 is a timing diagram for a ranging exercise involving outbound and inbound ranging signals.

FIG. 12 shows the transaction described above on a timing diagram. At time T1, a request is transmitted from a tag, e.g. a personnel locator device 10 or an equipment locator device 30, and the request transmit time (T1) is recorded. At time T2, the request is received by a node, e.g. a gateway 20, and the receive time (T2) is recorded. The node then waits for a turnaround time, calculated from its slot number, until time T3. At time T3, the node transmits a response which includes the timestamps T2 and T3. At time T4, the response is received by the tag and the receive timestamp of the response is recorded (T4). The time of flight (ToF) between the node and the tag can then be calculated using:

$$ToF = \frac{(T4 - T1) - (T3 - T2)}{2}$$

The above equation takes the mean of the measured time difference at the tag and at the node to generate a complete time of flight calculation. This is preferred over a single way ranging (using just T4 and T3) as it corrects for residual clock offset between the transmitter and the receiver (i.e. which hasn't been fully compensated by the clock synchronization process described above) and provides a 3 dB noise attenuation on the calculated time of flight. As can be seen in FIG. 12, the above calculation may be performed for a number of responses from different nodes.

The tag uses the information yielded from the ranging exchange to generate a location from the information yielded from the ranging exchange. This can include contributions from any number of the received node path distances, with weightings applied by range, received signal strength, residual error or other measures such as after bounced signal detection.

The time of flight between a personnel locator device 10 and/or an equipment locator device 30 and each of the plurality of gateways 20 may therefore effectively be calculated by subtracting the processing delay, i.e. T3-T2, from the time between the transmission of the first signal and receipt of the second signal and dividing the result by two. The distance between the personnel locator device 10 and/or an equipment locator device 30 and each of the plurality of gateways 20 may then be calculated by multiplying the time of flight by the speed of signal (the speed of light in the case of radio waves). The location of the personnel locator device 10 and/or an equipment locator device 30 relative to at least one of the plurality of gateways 20 can then be determined by the intersection of the distances between the personnel locator device 10 and/or an equipment locator device 30 and each of the plurality of gateways 20. As each of the gateways 20 is located at a known location within the industrial environment 100, the location of the personnel locator device 10 and/or an equipment locator device 30 (and thus the person 101 that the personnel device is located on or the equipment 102 that the equipment locator device 30 is located on) can be determined within the industrial environment 101. It is possible to determine the location of the personnel locator device 10 and/or an equipment locator device 30 by communication between the personnel locator device 10 and/or an equipment locator device 30 and three of the plurality of gateways 20. However, the accuracy of the determination may be increased by determining the distance between the personnel locator device 10 and/or an equipment locator device 30 and four or more of the plurality of gateways 20.

Figure 13:
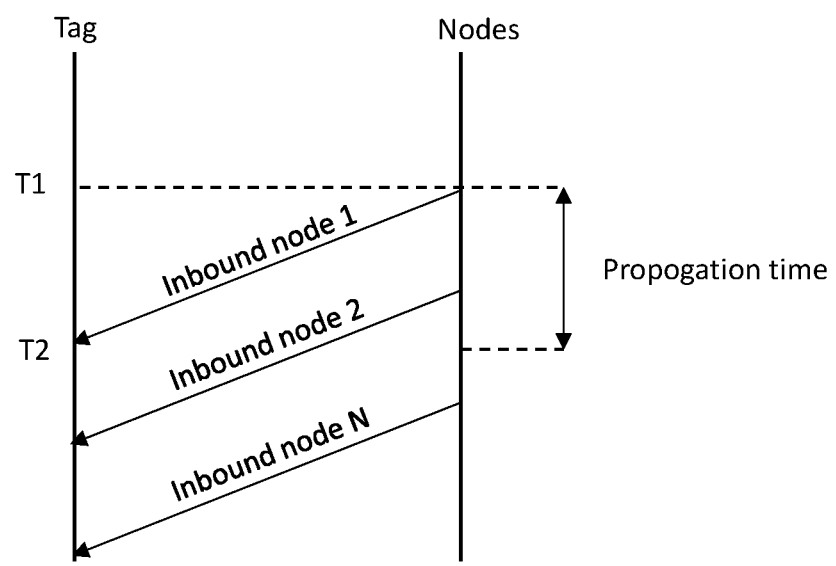
FIG. 13 is a timing diagram for a ranging exercise involving inbound ranging signals.

The method of determining the location of a person 101 and/or a piece of equipment 102 in an industrial environment 100 may include measuring the time of flight by a time difference on arrival calculation. The method may include transmitting an inbound signal from each of the plurality of gateways 20 to the personnel locator device 10 and/or an equipment locator device 30, measuring the time of arrival of the signal at the personnel device 10 and/or an equipment locator device 30 from each of the plurality of gateways 20 and calculating the difference between the time of arrival of each of the signals at the personnel device 10 and/or an equipment locator device 30 to determine the time of flight of the signals. The derived measurements of the times of flight are thus derived on the basis of the inbound signals. In this example, the calculation of the distances between the components and the position of the personnel locator device 10 and/or an equipment locator device 30 may take place on the personnel device 10 and/or an equipment locator device 30. FIG. 13 shows the transaction described above on a timing diagram.

Figure 14:
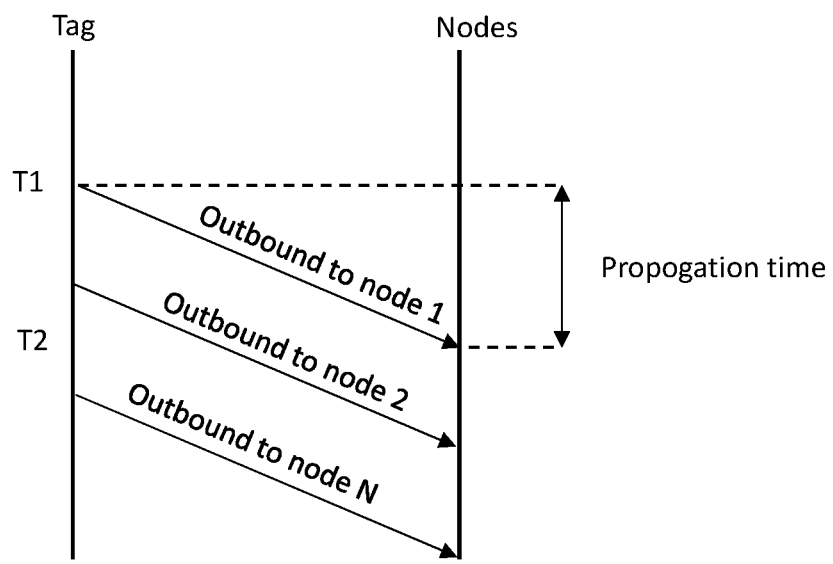
FIG. 14 is a timing diagram for a ranging exercise involving outbound ranging signals.

Alternatively or additionally, the measuring of the time of flight may include transmitting a signal from the personnel device 10 and/or an equipment locator device 30 to each of the plurality of gateways 20, measuring the time of arrival of the signal at each of the plurality of gateways 20 from the personnel device 10 and/or an equipment locator device 30 and calculating the difference between the time of arrival of the signal at each of the plurality of gateways 20 to determine the time of flight of the signals. In this example, the calculation of the distances between the components and the position of the personnel locator device 10 and/or an equipment locator device 30 may take place on one of the plurality of gateways 20. FIG. 14 shows the transaction described above on a timing diagram.

Determining the time of flight of the signal using the difference in the time of arrival of the signals at the personnel locator device 10 and/or at the equipment locator device 30 or at each of the plurality of gateways 20 may improve the reliability and time response of the method because only one signal is required to be passed between the personnel device 10 and the plurality of gateways 20.

The location of the person 101 and/or piece of equipment 102 may be determined with an accuracy of approximately 0.5 metres.

In the time of flight measurements described above, either in Direct TOF calculation or TDOA calculation wherein the personnel locator device 10 receives, the ranging information used is self-contained and requires no connection to a central location processing device, e.g. control device 40, as all information required to calculate position is transferred by the nodes, e.g. gateways 20 to the tag, e.g. personnel locator device 10. There is therefore no requirement for sideband communications to a control device, e.g. control device 40, required for the core location function. This allows a personnel locator device 10 to detect whether it is in a zone of interest, at low latency and without requiring a sideband communications channel. The network is also resistant to reconfiguration, where node devices 20 can be added, removed or relocated without requiring any supporting information to be uploaded to the tags 10.

Figure 15:
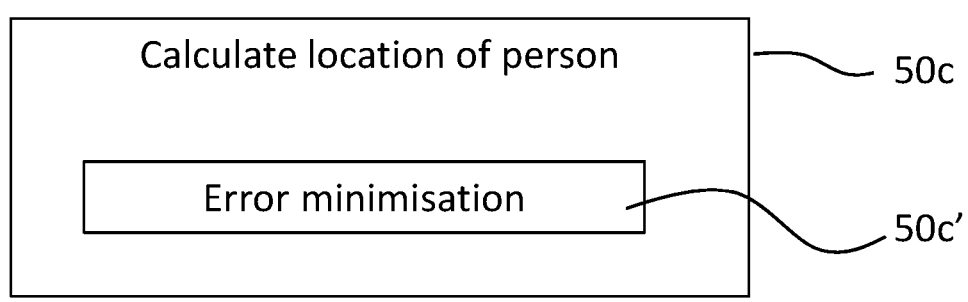
FIG. 15 is a diagram illustrating an optional error minimisation step.

The step of calculating the location of the personnel locator device 10 within the industrial environment 101 may comprises calculating the location that minimises an error between the measurements of times of flight. FIG. 15 demonstrates how the step 50c of calculating the location of a person seen in FIG. 4 involves a step 50c' of minimising an error between the measurements of times of flight. The location calculation 50c may use a gradient descent algorithm to find a position which minimizes the sum squared error of the measured path distances to each node, e.g. gateway 20. Furthermore, it weights the z-axis to ensure realistic height of the tag, e.g. PL device 10 or EL device 30 (when attached to a helmet or on a piece of machinery). The gradient descent algorithm as applied to multilateration for localisation is well covered in the literature. For reference, it finds a solution to the following optimization problem:

$$\operatorname*{argmin}_{e} f(e) = \sum_{i} [f_i(e) = (l_i - \|N_i - e\|)]$$

Where e is the estimated location and I is the observed path length to node i located at $N_i$. The algorithm proceeds iteratively by differentiating each of the constituent i error cost functions $f_i(e) = (l_i - \|N_i - e\|)$ with respect to e and using the resultant summation of the gradients $$G = \sum_{i} \frac{df_i(e)}{de}$$

to move e a sort distance in the direction of −G. Over the course of a number of iterations, the error cost functions descend towards a minimum. The algorithm exits when the error is deemed to have minimised, characterized by G reducing past a minimum threshold.

In practice the square of the cost function is used, i.e.

$$\operatorname*{argmin}_{e} f^2(e) = \sum_{i} f_i^2(e)$$

as it is simple to calculate the derivative of $f_i^2(e)$ with respect to e.

Figure 16:
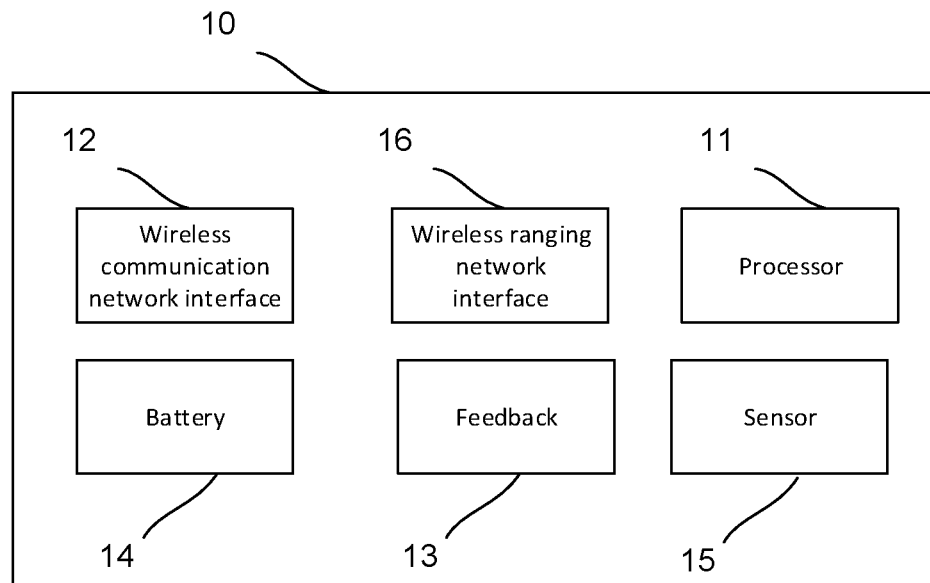
FIG. 16 is a schematic diagram of a personnel device.

The personnel locator device 10 provided to the person within the industrial environment 101, and for use with a safety sensing system comprising a plurality of gateways 20 located at predetermined locations in the industrial environment 101, will now be described in more detail. A schematic diagram of an example of a personnel locator device 10 is shown in FIG. 16. The personnel locator device 10 may include a processor 11, a wireless communication network interface 12, a wireless ranging network interface 16, a feedback unit 13, a battery 14 and a sensor unit 15. The processor 11 may implement the method shown in FIG. 4 and derive measurements of times of flight of radio ranging signals transmitted between the gateways 20 and the personnel locator device 10; calculate the location of the personnel locator device 10 within the industrial environment 101 based on the measurements of the times of flight of the radio ranging signals and reference information representing the predetermined locations of the gateways 20; and determine if the calculated location of personnel locator device 10 falls within one or more danger zones in the industrial environment 101 represented by zonal information and output a warning signal in response thereto. The calculation of the location of the person 101 described above may performed by the processor 11. The determination of if the location of the person 101 falls within the danger zone may be performed by the processor 11.

The wireless communication network interface 12 implements the wireless communication network and is capable of communicating with other personnel locator devices 10, equipment locator device 30, or gateways 20. The wireless communication network interface 12 may comprise a physical (PHY) layer, a media access control (MAC) layer and a network layer. The physical layer may include a radio frequency transceiver. The wireless communication network interface 12 may communicate using high frequency radio waves. The wireless communication network interface 12 may be arranged in accordance with the IEEE 802.15.4 technical standard which defines the operation of low-rate wireless personal area networks (LR-WPANs). The wireless communication network interface 12 may be used to receive, for example, zonal information from one or more gateways 20.

The wireless ranging network interface 16 is capable of sending and receiving ranging signals with other personnel locator devices 10, equipment locator devices, 30, or gateways 20. The wireless ranging network interface 16 may comprise a physical (PHY) layer, a media access control (MAC) layer and a network layer. The wireless ranging network interface unit 16 may send ranging signals using high frequency radio waves.

In this example, the wireless communication network interface 12 and the wireless ranging network interface 16 are separate components of the personnel locator device 10. However, a single wireless network interface may perform the function of both the wireless communication network interface 12 and the wireless ranging network interface 16.

The feedback unit 13 may provide feedback to the person 101 wearing the personnel locator device 10 when the person 101 is enters a danger zone, i.e. it may operate in response to a warning signal. For example, the feedback unit 13 may vibrate or provide another form of haptic feedback to alert the person 101. Alternatively or additionally, the feedback unit 13 may provide audible feedback such as an alarm to alert the person 101. The alarm may be audible through ear defenders. Alternatively or additionally, the feedback unit 13 may provide visual feedback. For example, the feedback unit may include an LED indicator which flashes when the person 101 enters a danger zone. The LED indicator may be provided as a demountable accessory or a wireless accessory. The LED indicator may show the status of the personnel locator device 10. For example, the LED indicator may flash green every two seconds when the personnel device 10 is operating normally, flash red rapidly if a fault is detected, display blue when the personnel device 10 is charging or flash blue every 2 seconds if the personnel locator device 10 is on standby mode.

The battery 14 provides a power source for the other components of the personnel locator device 10. The battery 14 may be configured for wireless or contactless charging to allow the personnel locator device 10 to be quickly and easily recharged. A wireless or contactless charger system may be provided for charging of the battery 14. The charging system may be contactless inductive charging. The charging system may be located within a safe zone in the industrial environment 100. The charging system may be able to charge at least 6 personnel locator devices 10 at the same time.

In addition, where personnel locator devices 10, equipment locator devices 30, comprises a battery 14 or similar energy storage devices 14, the battery or energy storage components 14 may be encapsulated in a potting compound of suitable density and porosity to certain minimum thickness. In a preferred embodiment, a thickness of encapsulant of at least 0.3 mm is utilised and preferably between 1 mm and 3 mm to eliminate porosity, voids or blowholes that may occur during potting and to withstand short circuits or overcurrent events. The potting or encapsulant may be applied to surround battery and/or any overcurrent circuits 14, and then cured under vacuum conditions to remove voids, bubbles or blowholes. The battery must be adequately bonded into an encapsulant or potting compound and a suitable epoxy or composite may be utilised to encapsulate and surround the battery to a minimum depth of at least 0.3 mm throughout. Similarly, the encapsulant or potting compound may be used to support the battery or energy storage device 14 from shock, impact and vibration while preserving its electrical properties. The electrical and physical properties of the encapsulant compound should be in accordance with standard IEC 60243-1 and/or IEC 60079-0 and/or IEC 60079-11 respectively and preferably a suitable compound such as an epoxy, Loctite or a silicone potting compound is utilised.

Placing the personnel locator device 10 on the charger may cause the personnel locator device 10 to enter a standby mode which may de-authorise the personnel locator device 10 for entry into the industrial environment 100. The standby mode may deactivate the feedback unit 13 of personnel locator device 10. The standby mode may reduce the rate of transmissions from the personnel locator device 10.

The sensor unit 15 may contain additional sensors to provide further information about the person 101 wearing the personnel locator device 10. For example, the sensor unit 15 may include an accelerometer which may be used to calculate the rate of motion of the person 101 wearing the personnel locator device 10. If the accelerometer determines that the rate of motion of the person 101 has increased or decreased, the rate of determination of the location of the person 101 can be increased or decreased respectively to maintain the accuracy if the determination while minimising power consumption in the personnel locator device 10.

The sensor unit 15 may also contain additional sensors, such as an inertial measurement unit (IMU). This may incorporate 3-axis gyroscopes, 3-axis accelerometers and magnetometers. In devices including an IMU, the step 50c, described earlier with respect to FIG. 4, of calculating the location of the personnel locator device 10 within the industrial environment 100 may take account of the output of the IMU. The output of the IMU may be 'fused' or combined with time of flight measurements to improve the accuracy, precision and stability of the location of the sensor unit 15 in the industrial environment 101. Algorithms processing IMU data and combining with time of flight measurements obtained using RF location could be exploited to locate the personnel locator device 10, if it is not possible due to a 'blind spot', reduced or attenuated signal or inadequate RF coverage. In this manner, the IMU output may be used to 'smooth' the location of the individual or equipment without RF, UWB or optical measurements of time of flight.

In addition, a magnetometer may be used to generate a 'map' or chart of an environment, particularly if it is largely or partially metallic or ferrous metals are present. This log of the magnetic fields present in the industrial environment 101 may be used to locate the sensor unit 15 by means of vertices or a point-map or a chart of magnetic field distribution around a rig or drill floor or ship or some other partially metallic environment. In this manner the sensor unit 15 may locate individuals 101 or equipment 102 in the absence of a radio signal and when time of flight measurements that are radio-frequency are limited, incomplete or inaccurate. The device of the invention may combine time of flight measurements, by means of measuring the time of flight of RF signals to a device from nodes, or vice versa, with IMU measurements of attitude, velocity, acceleration and magnetic field strength, and comparison with a map or chart of magnetic fields in an environment overlaid on a layout or plan view of an industrial environment.

Additional filtering of IMU measurements may be requirement by means of Kalman filtering and to exclude the motion of a moving frame of reference such as on board a ship or floating platform. The map or chart or log of magnetic field strength may be compared with IMU measurements to provide a location when there is no, or limited, RF signal and a time of flight measurement would be inaccurate. The sensor unit 15 can switch between methods or weight the output of different measurement depending on variables such as field strength, signal levels and drift. The time of flight measurements may be used to correct for IMU drift once RF signal levels are acceptable and provide and accurate location or fix.

The personnel locator device 10 may further include a near field communication (NFC) unit. The NFC unit may be scanned to identify the personnel locator device 10. The NFC unit may be scanned as a person 101 equipped with a personnel locator device 10 enters or exits the industrial environment 100. The presence of personnel 101 within the industrial environment 100 can therefore be additionally tracked.

The personnel locator device 10 may be configured to fit within a pocket of the person 101 were the personnel locator device 10 is located. Alternatively or additionally, the personnel locator device 10 may have a lanyard or other method of attaching the personnel locator device 10 to the person 101. The personnel locator device 10 may be mounted inside personal protection equipment, for example as part of a high visibility vest. The personnel locator device 10 may be provided as part of a wrist band. The personnel locator device 10 may be located between the shoulder blades of the person 101. The personnel locator device 10 should be mounted in such a way that feedback from the feedback unit 13 such as a vibration is felt by the person 101 The personnel locator device 10 may be manufactured from a chemically resistant plastic. The personnel locator device 10 may have a maximum size of 50 mm×120 mm×25 mm. The personnel locator device 10 may have a maximum weight of 200 g. The battery life of the personnel locator device 10 may be 1 month and may be a minimum of 1 week. The recharge time of the personnel locator device 10 may be a maximum of 6 hours.

The equipment locator devices 30 may include each of the components that may be included in the personnel locator device 10, and the equipment locator devices 30 may operate in substantially the same manner as the personnel locator device 10 described above.

Figure 17:
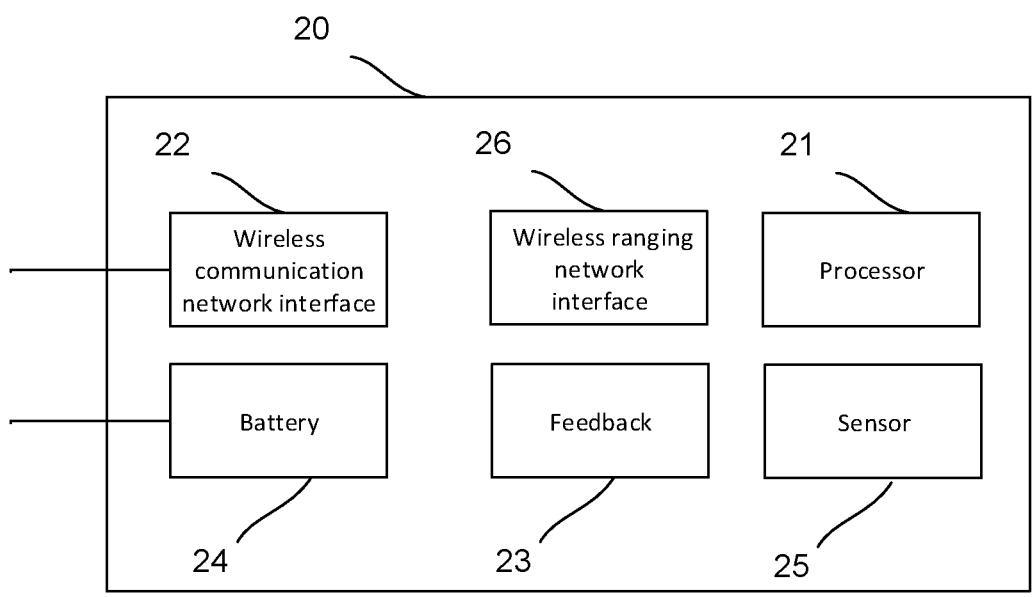
FIG. 17 is a schematic diagram of a node.

The gateways 20, i.e. nodes, located at a predetermined location within the industrial environment 100 will now be described in more detail. A schematic diagram of an example of a gateway 20 is shown in FIG. 17. The gateway 20 may include each of the components that may be included in the personnel locator device 10 described above. For example, the gateway 20 may include a processor 21, a wireless communication network interface 22 a wireless ranging network interface 26, a feedback unit 23, a battery 24 and a sensor unit 25. In addition to this, the communication unit 22 may have a wired connection to other gateways or the external controller, such as an Ethernet connection. The battery 24 of the gateway 20 may be replaced by a wired power connection. The battery 24 of the gateway 20 may be of a larger capacity than the personnel unit 10.

The calculation of the location of the person 101 described above may be performed by one of the plurality of gateways 20. The determination of if the location of the person 101 falls within a danger zone may be performed by one of the plurality of gateways 20.

Figure 18:
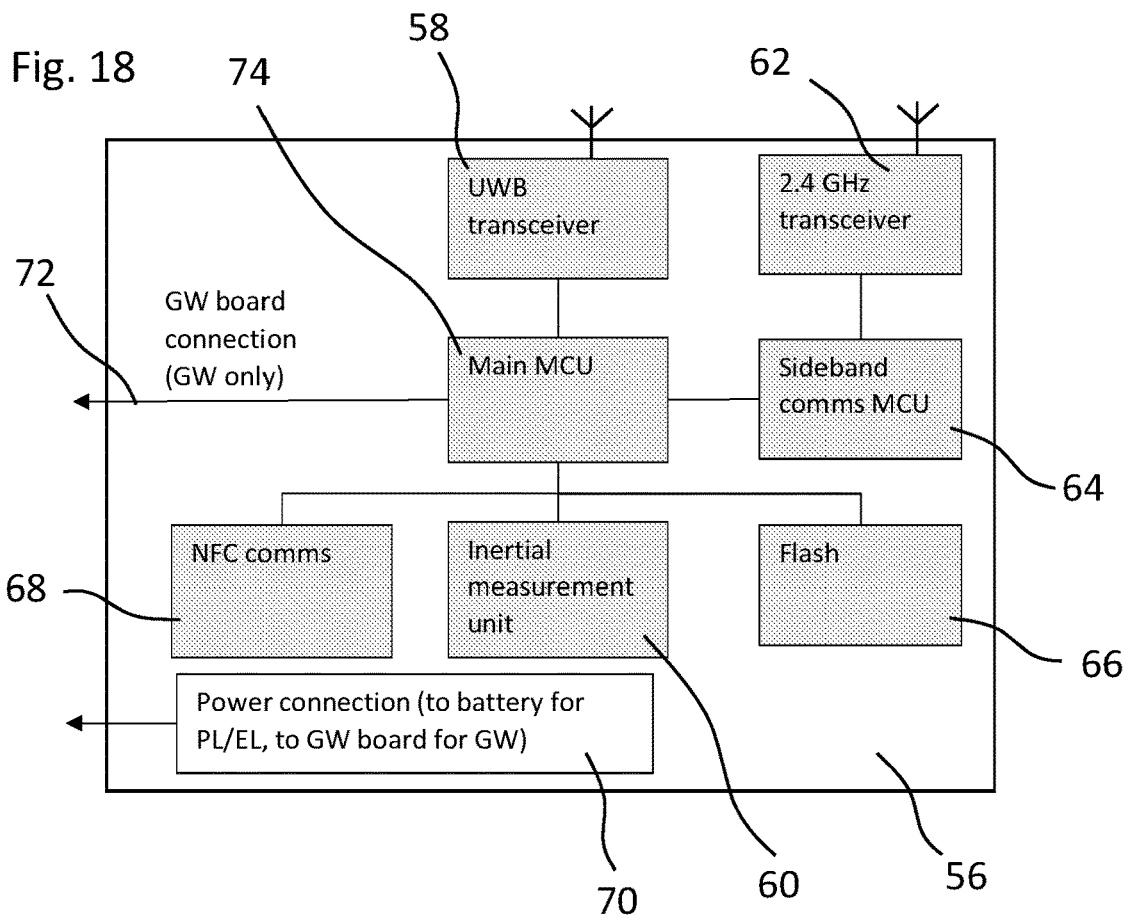
FIG. 18 is a schematic diagram of a main processor board.

All three types of device: personnel locator devices 10, equipment locator devices 30 and gateways 20 may use a common main processor board to implement the core functionality of the method and system. FIG. 18 shows a block diagram of the constituent components of a common main processor board 56. The main processor board 56 comprises an UWB transceiver, or chip, 58 which may be driven to implement a distance ranging algorithm from a tag to a plurality of nodes at regular intervals. The common main processor board 56 also comprises an IMU 60 which may be driven to provide complementary location tracking information in tandem with the UWB ranging function (when operating as a tag). As mentioned previously, this may help to improve the accuracy of the location calculation.

The common main processor board 56 may further comprise a 2.4 GHz communications network transceiver 62 which may be driven to connect to a central server. A sideband communication microcontroller unit (MCU) 64 may be connected to the network transceiver 62. The common main processor board 56 may comprises a flash storage medium 66 for storage and retrieval of non-volatile data, for example device serial number and, calibration and configuration data. The common main processor board 56 may further comprise a near-field communication (NFC) transceiver 68 which may be driven for configuration of devices directly. The common main processor board 56 further comprises a power connection 70 for providing power to the common main processor board 56 and a gateway connector 72 for connecting the common main processor board 56 to a carrier board as described below. The various components of the common main processor board 56 as described above are connected to a main microcontroller unit 74 which may control overall operation of the common main processor board 56 and its components.

The common main processor board 56 may be employed, for example, in either of the personnel locator device 10, or gateway 20 seen in FIGS. 16 and 17, or indeed in an equipment locator device 30. For example, when the common main processor board 56 forms part of the personnel locator device 10, the processor 11 may be provided by the main MCU 74, the wireless ranging network interface 16 may be provided by the UWB transceiver 58, and the wireless communication network interface 12 may be provided by the transceiver 62 and sideband communication MCU 64. When the common main processor board 56 forms part of the gateway 20, the processor 21 may be provided by the main MCU 74, the wireless ranging network interface 26 may be provided by the UWB transceiver 58 and the wireless communication network interface 22 may be provided by the transceiver 62 and sideband communications MCU 62.

Figure 19:
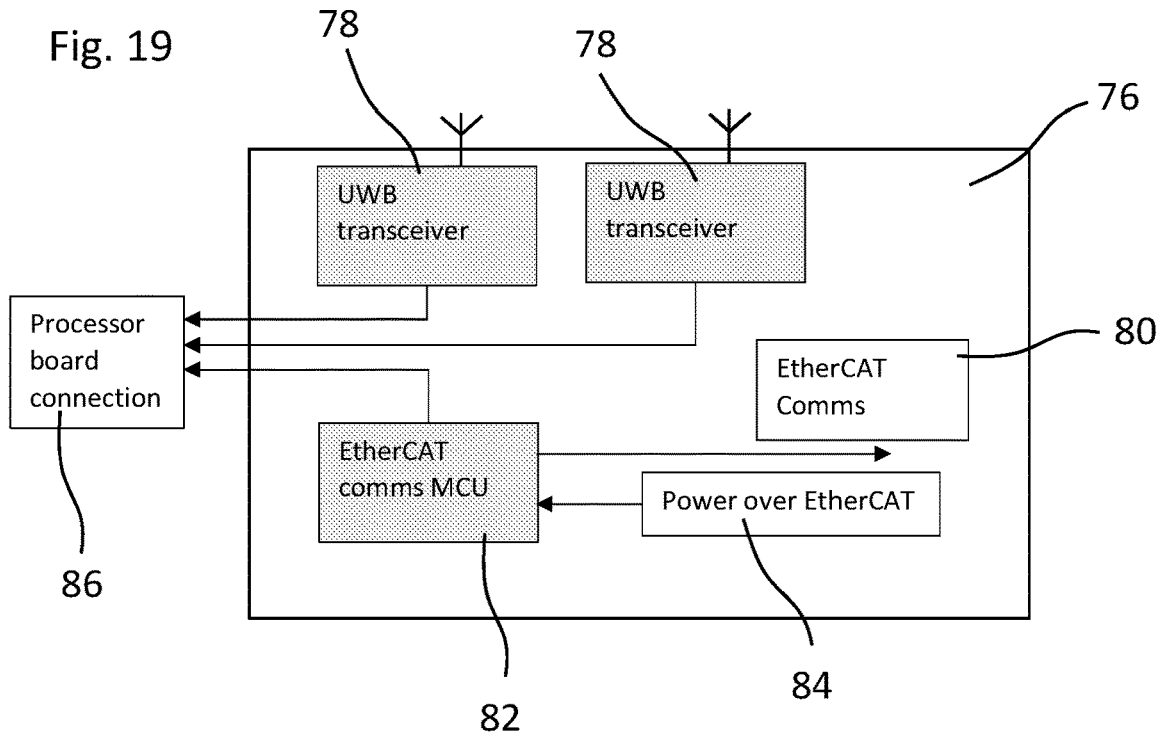
FIG. 19 is a schematic diagram of a carrier board.

When the common main processor board 56 forms part of a gateway 20, a further carrier board 76 may be used. A block diagram of a carrier board 76 is shown in FIG. 19. The carrier board 76 comprises another two UWB transceivers 78, which allow the Angle of Arrival (AoA) of signals to the gateways 20 to be determined and thus provide the gateway 20 with AoA information. The use of such AoA information will be described in further detail below. The carrier board 76 further comprises EtherCAT communications backhaul 80 for wired communications along with an EtherCAT communications MCU 82. Power may be supplied over EtherCAT 84 for powering the carrier board 76 and the common main processor board 56. The carrier board 76 also includes a processor board connection 86. A gateway 20 will typically comprise a common main processor board 56 mounted into a gateway board 76.

As mentioned briefly above, the gateways 20 may be arranged to detect the angle of arrival of the radio ranging signals, and the step 50*c* of calculating the location of the personnel locator device 10 within the industrial environment 101 may take account of the detected angle. As described previously, gateways 20 may include a carrier board 76 which comprises two UWB transceivers 78 which allow the detection of angle of arrival (AoA) of a ranging request. The information relating to the AoA will be sent back in the ranging response packet, with the node's location, orientation, timestamps etc.

Figure 20:
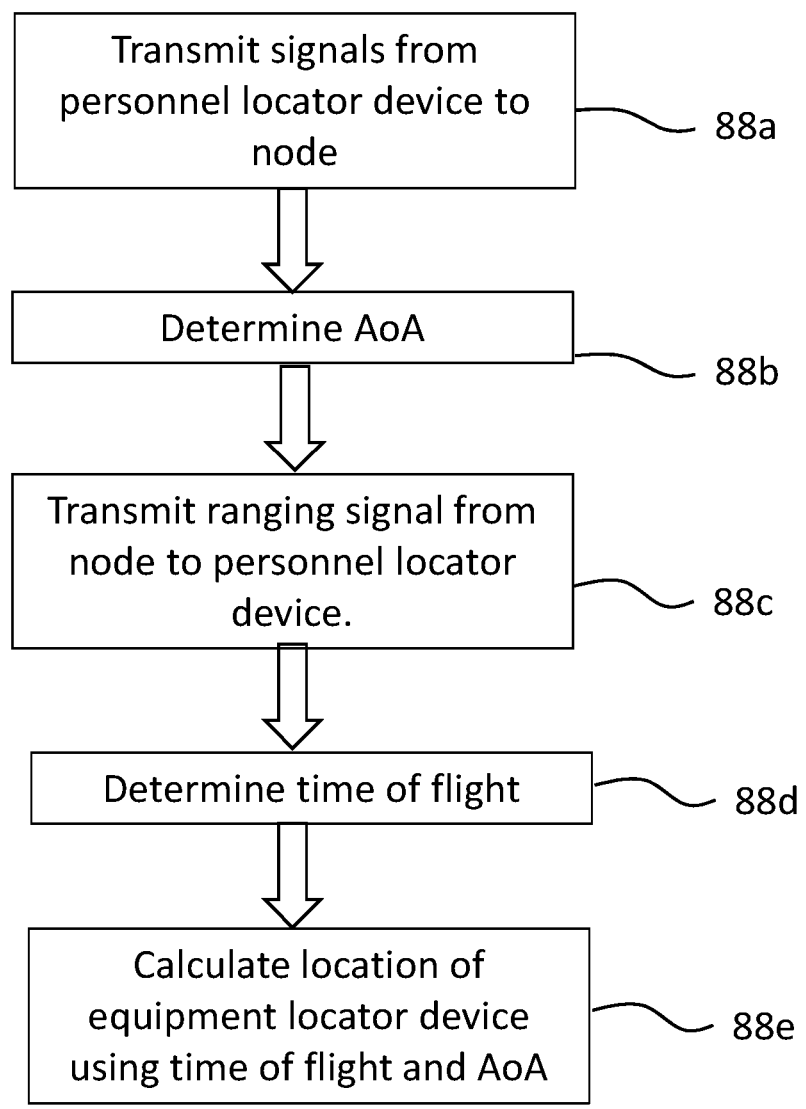
FIG. 20 is a diagram of the steps performed using angle of arrival determination.

On each gateway 20, a received ranging response signal is down-mixed to baseband and correlated with a locally generated spreading sequence to generate an accurate time and phase of arrival of a received signal. With a separation of half of the wavelength of the transmitted signal between receive antennas, e.g. the two UWB transceivers 78, and both receivers accurately clocked against a single reference, the phase difference of the output of the correlators can be used to give an accurate angle of arrival of the signal. Ambiguities in the detected AoA can be resolved using the timestamps of the signals with respect to one another. US-2017/0085293 discloses techniques employing measurement of angle of incidence in an ultrawideband communication system that may be applied herein. By taking the angle of arrivals to each node e.g. gateway 20, with given coordinates, device triangulation can be used to improve the accuracy of a position fix in global coordinates. In theory, the path distance and angle to only a single node is required to give a position fix in 2-D coordinates. In practice, however, the extra information will be used to attenuate the contribution of noise from the signals collected from multiple nodes, e.g. gateways 20. FIG. 20 shows a flow chart illustrating an example process wherein the AoA information is utilized. In step 88*a* outbound ranging signals are transmitted from a personnel locator device 10 to a node, e.g. gateway 20 or EL device 30. In step 88*b*, the AoA of the ranging signal is determined. The process may stop here and the node may determine the time of flight based on transmit time information forming part of the ranging signal transmitted from the personnel locator device 10. However, the process may continue to include further steps. In step 88*c*, an inbound ranging signal may be sent from the node to the personnel locator device 10. The AoA of the first ranging signal may be transmitted as part of this return ranging signal. In step 88*d* the time of flight of the outbound and inbound ranging signals may be calculated. In step 88*e* the location of the personnel locator device 10 may be determined making use of the time of flight and the AoA of the outbound signal. Of course the same process may occur between a node and an equipment locator device 30.

The plurality of gateways 20 and/or the personnel device 10 and/or equipment locator device 30 may be in communication with the control device 40, which may be a computer. The computer may receive information from the plurality of gateways 20 and/or the personnel device 10 and/or equipment locator device 30 on the location of the person 101 within the industrial environment 100. The computer may display the locations of the gateways 20 and/or the personnel devices 10 and/or equipment locator device 30 on a map of the industrial environment 100 to an operator displayed on a graphical user interface (GUI). The GUI may show a plan of the industrial environment 100. The GUI may provide positional data from all of the gateways 20 and/or personnel 10 and equipment devices 30. The GUI may display the different components of the system in different colours. The GUI may show the location of danger and safe zones. The GUI may also show detailed information for all of the devices, such as a serial number, battery level, signal level and time since last communication. A person or equipment name may be associated with a device serial number. The operator may issue commands to the plurality of gateways 20 and/or the personnel device 10 and/or equipment locator device 30 using the computer. For example, the operator may cause the feedback unit 13 of the personnel device 10 to activate.

The system may support at least thirty personnel devices 10, twelve gateways 20, twenty equipment devices 30, and two control devices 40.

The danger zone will now be described in more detail. The danger zone represents an area or volume within the industrial environment 100 which may be hazardous or lead to a hazardous situation if entered by a person 101. The danger zone may be a predefined volume of space in the industrial environment 100. Alternatively or additionally, the danger zone may be associated with a piece of equipment 102 located in the industrial environment 100. The location of the danger zone may be fixed within the industrial environment 100. The location of the danger zone may be defined at the control device 40 using the GUI. The location and direction of travel of equipment 102 may be taken into account when defining the danger zone.

The location of the danger zone associated with the piece of equipment 102 may be determined by locating an equipment locator device 30 on the piece of equipment 102. The equipment locator device 30 may be the same in construction as the personnel locator device 10 discussed above. The maximum size of the equipment locator device 30 may be 100 mm×120 mm×125 mm. The maximum weight of the equipment locator device 30 may be 500 g. The battery of the equipment locator device 30 may be larger than the battery 14 of the personnel locator device 10. The minimum battery life of the equipment locator device 30 may be 2 months. The equipment locator device 30 may be mounted or attached to a piece of equipment 102 using a releasable clip, a bolt, welding, adhesive or a magnetic attachment. The equipment locator device 30 may perform any of the functions of the personnel locator device 10 as discussed above.

The equipment locator device 30 may be located on any piece of equipment 102 that may represent a hazard to personnel 101 within the industrial environment. In the example of a platform in the oil and gas industry, the equipment locator device 30 may be located on equipment including a piperacker, a roughneck, the well centre or rotary table, the top drive and elevator, the pipe skate and riser catwalk, and tongs. Multiple equipment locator devices 30 may be provided at different locations on a piece of equipment 102.

The time of flight of signals between the equipment locator device 30 located on the piece of equipment 102 and the wireless network may be measured and the location of the piece of equipment 102 within the industrial environment 100 may be calculated based on the time of flight of the signals. The danger zone may be based on the location of the piece of equipment 102. Control information associated with the piece of equipment 102 may also be obtained. The control information may be signals provided to the equipment 102 to operate motors or actuators that cause the piece of equipment to move 102. Alternatively or additionally, the control information may be measurements of the motion of the motors or actuators that cause the piece of equipment 102 to move. The control information associated with the piece of equipment may be received, for example, by the personnel locator device 10 or node, e.g. gateway 20 and the danger zone may also be based on the control information associated with the piece of equipment 102.

The danger zone does not necessarily define a single continuous area or volume. Separate regions of the danger zone may be associated with different pieces of equipment 102 or other hazards within the industrial environment 100. The danger zone may be divided into different sub-zones depending on the level of hazard associated with a particular part of the danger zone. For example, part of the zone associated with a piece of equipment 102 may be divided into an inner zone and an outer zone, where the inner zone defines a region closer to the piece of equipment 102 than the outer zone. The response of the system may be different depending on which sub zone that the location of the person 101 is determined to be in. For example, the system may cause the personnel device 10 to vibrate when the location of the person 101 is determined to be in the outer zone. The system may then additionally activate an audible alarm when the location of the person 101 moves within the inner zone. The size of the danger zone associated with a piece of equipment 102 may change if a piece of equipment 102 is in motion. For example, the size of the danger zone may increase if the piece of equipment 102 is in motion.

The remedial action may also vary depending on if the piece of equipment 102 is in motion. For example, when the piece of equipment 102 is not in motion, a warning may be provided to the user of the control device 40 via the GUI. In this example, the warning indicates to the user to not initiate motion of the piece of equipment when personnel 101 are present in the danger zone. When the equipment 102 is not in motion, a warning may not be provided to the person 101 within the danger zone. This may prevent distraction if personnel 101 are regularly within the danger zone when the equipment 102 is not in motion. The remedial action may vary depending on the rate of motion of the piece of equipment 102. The remedial action may be slowing and stopping the piece of equipment 102 in a slow manner to prevent damage to the piece of equipment 102. The remedial action may be stopping the piece of equipment 102 as quickly as possible.

Danger zones may be defined in two or three dimensions. For example, in two dimensions, a circular danger zone may be defined around a piece of equipment 102 or an equipment locator device 30. In three dimensions, a spherical danger zone may be defined around a piece of equipment 102. The danger zone may also be based on the movement path of a piece of equipment 102. Zones may be defined by absolute positions. Each tag, e.g. each personnel locator device 10, may hold a catalogue of zones which can be defined in absolute coordinates, or alternatively with respect to the locations of other tags, e.g. personnel locator devices 10 or equipment locator devices 30. Information used to define zones may take, for example, one or more of the following forms: circular or spherical zones can be defined by a centre point plus a radius, elliptical or spheroid zones can be defined by a centre point plus two or more orthogonal vectors defining radii in a given trajectory, rectangular or cuboid zones can be defined by two points defining opposite vertices plus a rotation vector and arbitrarily shaped zones can be defined by a list of points which define a convex hull in 2-D or 3-D space.

Processing on board the tags, e.g. personnel locator devices 10, can detect, given an absolute location, whether the tag is within any of its configured zones of control, using the output of the function generate a warning signal to drive a warning function for a person 101 or device close to, or holding the tag, or to transmit a warning through sideband communications e.g. over a radio communication system.

The personnel locator device 10, gateways 20 and equipment locator device 30 may also interface directly with pieces of equipment 102. The signal output if a person 101 is located within a danger zone may activate equipment emergency stops or interlocks.

A safe zone may be defined within the industrial environment 100. The safe zone may be defined in the same way as the danger zone, except that the safe zone represents an area of the industrial environment 100 where a person 101 is unlikely to come to harm. If the calculated location of the personnel locator device 10, and hence the location of the person 101, falls within one or more safe zones within the industrial environment 100 represented by the zonal information, the method may be ceased and transmission of signals from the personnel device 10 may be stopped. Other active functions of the personnel device 10 may also be deactivated. Performing this reduction of operation of the personnel locator device 10 when the person 101 enters the safe zone may reduce power consumption and extend the battery life of the locator personnel device 10.

Operation of the pieces of equipment 102 may also be based on when the location of the person 101 is determined to fall within the safe zone. For example, operation of pieces of equipment 102 may started once the location of the person 101 is determined to fall within the safe zone. Different parts or sections of the safe zone may be associated with different pieces of equipment 102.

The operation of the personnel locator device 10 within the industrial environment 100 may also be tracked by determining that signals are not passing between the personnel locator device 10 and the wireless network and outputting a signal indicating that the location of the person 101 cannot be determined. This may occur if the battery 14 of the personnel locator device 10 has run out or a component of the personnel locator device 10 has broken. Operations in the industrial environment 100 may be shut down in response to the signal to allow the location of the person 101 with the non-operative personnel device 10 to be located and issued with a working personnel locator device 10.

Any of the personnel locator device 10, gateways 20 and equipment locator device 30 may perform self-diagnostic tests at regular intervals. A self-diagnostic test of the personnel locator device 10 may be performed in response to the person 101 moving into a self-check zone within the industrial environment 100. A self-diagnostic test on any of the personnel locator device 10, gateways 20 and equipment locator device 30 may be initiated from the control device 40. The self-diagnostic test may be initiated using the GUI. Any faults detected may be transmitted to the control device 40 and displayed to a user by the GUI. The control device 40 may log each warning signal generated by the system, for example for review at safety briefings. Self-diagnostic tests may include checking battery level, the signal level between different devices, whether a device is missing and whether the location of a device is unknown or if the determination of the location of the device has become unreliable or out of bounds. For example, if a personnel locator device 10 or an equipment locator device 30 is determined to be moving at an unexpectedly high speed, the determination of the location may be deemed unreliable. The location of the equipment locator device 30 may be compared to the control information associated with piece of equipment 102 on which the equipment locator device 30 is mounted. The feedback unit 13 of the device may also be tested. The test of the feedback unit 13 may familiarise the person 101 with the haptic, audible or visual alarm provided by the feedback unit 13. Any of the components of the self-diagnostic tests may also be performed as part of a pre-use test. When issued with a personnel locator device 10, the person 101 may take the personnel device to a test zone in the industrial environment 100. The pre-use test may be performed in the test zone.

There is also disclosed herein a safety sensing method for a person in an industrial environment, the method comprising measuring the time of flight of signals between a personnel device located on the person and a plurality of nodes located at predetermined locations in the industrial environment, calculating the location of the person within the industrial environment based on the measured times of flight of the signals determining if the location of the person is within a danger zone in the industrial environment and outputting a warning signal in response thereto.

The plurality of nodes form a network and the signals may be transmitted over the network.

Measuring the times of flight may comprise transmitting outbound signals from the personnel device to the plurality of nodes, transmitting return signals from the plurality of nodes to the personnel device in response to the outbound signal and in respect of each node, measuring the total time of flight of the outbound signal and the time of flight of the return signal.

Measuring the time of flight may comprise transmitting an outbound signal from the personnel device to each of the plurality of nodes, measuring the times of arrival of the signal at each of the plurality of nodes from the personnel device and calculating the times of flight of the outbound signals from the measured times of arrival of the outbound signal.

The step of calculating the location of the person may be performed by the personnel device.

The step of calculating the location of the person may be performed by one or more of the plurality of nodes.

The step of determining if the location of the person falls within a danger zone may be performed by the personnel device.

The step of determining if the location of the person falls within a danger zone is performed by one or more of the plurality of nodes.

The danger zone may be a predefined volume of space in the industrial environment.

The danger zone may be associated with a piece of equipment located in the industrial environment.

The method may further comprise measuring the times of flight of signals between an equipment device located on the piece of equipment and the plurality of nodes and calculating the location of the piece of equipment within the industrial environment based on the measured times of flight of the signals wherein the danger zone is based on the calculated location of the piece of equipment.

The method may further comprise receiving control information associated with the piece of equipment and updating the danger zone based on the control information associated with the piece of equipment.

The method may further comprise determining if the location of person falls within a safe zone within the industrial environment and ceasing performance of the method in response thereto.

The method may further comprise determining whether the signals are failing to be passed between the personnel device and the wireless network and outputting a failure signal in response thereto.

The method may further comprise receiving the warning signal at the personnel device and the personnel device providing feedback to the person on which the personnel device is located in response thereto.

The method may further comprise receiving the warning signal at a control device and the control device displaying an alert to the user of the control device in response thereto.

The method may further comprise ceasing operation of equipment within the industrial environment in response to the warning signal.

The method may further comprising receiving a signal from a surveillance system including a camera, the signal including positional information of a further person in the industrial environment, determining that the positional information of the further person does not correspond to the calculated location of the person within the industrial environment and outputting a warning signal in response thereto.

Further according to the method discussed above, there is provided a safety sensing system for a person in an industrial environment, the system comprising a personnel device located on the person and a plurality of nodes of a network located at predetermined locations in the industrial environment, the system being arranged to measure the time of flight of signals between the personnel device and the plurality of nodes, calculate the location of the person within the industrial environment based on the measured times of flight of the signals and determine if the location of person falls within a danger zone in the industrial environment and output a warning signal in response thereto.

The invention claimed is:

1. A safety sensing method for a person in an industrial environment, the method comprising:
    providing a personnel locator device for location on a person and a reference system comprising a plurality of nodes located at predetermined locations in the industrial environment;
    transmitting radio ranging signals between the nodes and the personnel locator device;
    deriving measurements of timings of the radio ranging signals between the nodes and the personnel locator device;
    calculating the location of the personnel locator device within the industrial environment based on the measurements of the timings of the radio ranging signals between the nodes and the personnel locator device and reference information representing the predetermined locations of the nodes;
    receiving control information associated with a piece of equipment, located in the industrial environment, wherein a danger zone associated with the piece of equipment is defined in dependence on the control information; and
    determining if the calculated location of the personnel locator device is within the danger zone.

2. The safety sensing method of claim 1, wherein the control information comprises control signals provided to the equipment to cause the equipment to move.

3. The safety sensing method of claim 1, wherein the control information comprises measurements of the motion of the equipment.

4. The safety sensing method of claim 1, wherein, in response to the warning signal, a haptic, visual or audible alarm is provided to the person and/or the operation of the equipment is ceased.

5. A safety sensing method according to claim 1, wherein the radio ranging signals are transmitted from different personnel locator devices and nodes in time slots allocated to respective personnel locator devices and nodes.

6. A safety sensing method according to claim 1, wherein the personnel locator device comprises an inertial measurement unit and the step of calculating the location of the personnel locator device within the industrial environment takes account of the output of the inertial measurement unit.

7. A safety sensing method according to claim 1, wherein
    the nodes are arranged to detect the angle of arrival of the radio ranging signals, and
    the step of calculating the location of the personnel locator device within the industrial environment takes account of the detected angle.

8. A safety sensing method according to claim 1, wherein the method further comprises determining if the calculated location of personnel locator device falls within one or more safe zones within the industrial environment represented by the zonal information and ceasing performance of the method in response thereto.

9. The safety sensing method of claim 1, wherein the control information includes signals provided to the equipment to operate motors or actuators that cause the equipment to move; and/or
    the control information includes measurements of the motion of the motors or actuators that cause the equipment to move.

10. A safety sensing method, comprising:
    receiving first position data associated with a plurality of wearable sensors associated with a plurality of personnel, the first position data being representative of positions of the personnel within a hazardous environment;
    receiving second position data representative of a zone associated with equipment within the hazardous environment;
    comparing the first position data to the second position data to detect that a personnel from the plurality of personnel is within the zone;
    receiving signals provided to the equipment to cause the equipment to move; and
    ceasing operation of the equipment, in response to the detection that the personnel is within the zone.

11. The safety sensing method of claim 10, further comprising sending a signal to at least one of a plurality of alert devices associated with the hazardous environment such that the at least one alert device issues an alert, wherein each alert device and each wearable sensor are components of a personnel locator device worn by the personnel.

12. The safety sensing method of claim 10, wherein the second position data is generated by a sensor attached to the movable machine.

13. The safety sensing method of claim 10, wherein the second position data is based on the movement path of the equipment.

14. The safety sensing method of claim 10, further comprising sending a signal to an alert device associated with the equipment such that the alert device issues an alert, wherein the alert is a visual alert, an audible alert, or a haptic alert.

15. The safety sensing method of claim 10, wherein the second position data defines the zone in three dimensions.

16. The safety sensing method of claim 10, wherein each of the plurality of the wearable sensors is a ranging sensor.

17. The safety sensing method of claim 16, further comprising receiving, from an optical sensor monitoring the hazardous environment, third position data associated with the human within the hazardous environment, and comparing the first position data and the third position data to the second position data to detect that the human is within the zone.

18. The safety sensing method of claim 10, wherein the zone is a danger zone.

19. The safety sensing method of claim 10, wherein the signals provided to the equipment to cause the equipment to move are control information that includes:
   signals provided to the equipment to operate motors or actuators that cause the equipment to move, and/or
   measurements of the motion of the motors or actuators that cause the equipment to move.

* * * * *